(12) United States Patent
Sato et al.

(10) Patent No.: US 7,801,704 B2
(45) Date of Patent: Sep. 21, 2010

(54) METHOD AND SYSTEM FOR AZIMUTH MEASUREMENTS USING GYRO SENSORS

(75) Inventors: Shigeru Sato, Tokyo (JP); Juei Igarashi, Kanagawa-Ken (JP); Akira Kamiya, Kanagawa-Ken (JP); Tsutomu Yamate, Kanagawa-Ken (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 96 days.

(21) Appl. No.: 12/233,592

(22) Filed: Sep. 19, 2008

(65) Prior Publication Data

US 2009/0287451 A1 Nov. 19, 2009

Related U.S. Application Data

(60) Provisional application No. 61/053,646, filed on May 15, 2008.

(51) Int. Cl.
*G01C 9/00* (2006.01)
*G01C 19/00* (2006.01)
*G06F 15/00* (2006.01)

(52) U.S. Cl. ............... 702/189; 702/153; 33/313; 33/324

(58) Field of Classification Search ............... 702/189, 702/155, 153; 33/313, 324
See application file for complete search history.

(56) References Cited

U.S. PATENT DOCUMENTS 5,821,414 A * 10/1998 Noy et al. ............... 73/152.54

| | | |
|---|---|---|
| 6,381,853 B1 | 5/2002 | Parke |
| 6,453,239 B1 | 9/2002 | Shirasaka et al. |
| 6,529,834 B1 | 3/2003 | Estes |
| 6,633,816 B2 | 10/2003 | Shirasaka et al. |
| 7,117,605 B2 | 10/2006 | Ekseth |
| 7,234,540 B2 | 6/2007 | Estes et al. |
| 2002/0174720 A1 | 11/2002 | Cardarelli |
| 2003/0056381 A1 * | 3/2003 | Brosnahan et al. ............ 33/313 |

FOREIGN PATENT DOCUMENTS

| | | |
|---|---|---|
| DE | 19505855 | 2/1996 |
| EP | 0175298 | 3/1986 |
| GB | 2296772 | 7/1996 |
| GB | 2351807 | 1/2001 |
| JP | 2006038650 | 2/2006 |
| JP | 2006177909 | 7/2006 |
| WO | 99/28594 | 6/1999 |
| WO | 2007/005637 | 1/2007 |

* cited by examiner

*Primary Examiner*—Bryan Bui
(74) *Attorney, Agent, or Firm*—Daryl Wright; Jody DeStefanis; Jeff Griffin

(57) ABSTRACT

A method and system for azimuth measurements using one or more gyro sensors is disclosed. The method includes acquiring a first data from each of the gyro sensors with an input axis aligned to a first angular orientation and acquiring a second data from each of the gyro sensors with the input axis flipped to a second angular orientation opposite to the first angular orientation. An earth rate component at the first angular orientations is determined based on a difference between the first data and the second data to cancel out bias of each of the gyro sensors. The method may include acquiring a third data of the gyro sensor with the input axis aligned to the same angular orientation as the first angular orientation. An average of the first data and the third data may be used instead of the first data for determining the earth rate component.

59 Claims, 23 Drawing Sheets

METHOD AND SYSTEM FOR AZIMUTH MEASUREMENTS USING GYRO SENSORS

CROSS-REFERENCE TO RELATED APPLICATIONS

This application claims priority to U.S. Provisional Patent Application No. 61/053,646 filed May 15, 2008, which is incorporated herein by reference.

FIELD OF THE INVENTION

The present invention relates to techniques of azimuth measurements using gyro sensors in downhole, for example, for azimuth measurements during Measurement-While-Drilling (MWD) or Logging-While-Drilling (LWD), and wireline logging operations. More particularly, the invention relates to measurements of the earth rate vector direction for azimuth determination with gyros sensors (e.g. MEMS gyro sensors) and accelerometer sensors.

BACKGROUND OF THE INVENTION

Azimuth measurement technology in downhole is mostly categorized into measurements with magnetometers and measurements with gyro sensors. The former uses triad magnetometers to measure earth magnet field. However, the magnetometers can be used only in the place without any magnetic influence by magnetic materials like a casing. The latter uses gyro sensors to measure earth rate vector direction for azimuth determination. The gyro measurements are hardly influenced by magnetic field. Therefore, the gyro sensor can be used near or in such a casing of magnetic materials.

Some gyro sensors may show a large and instable bias, comparing with the earth rate (15°/hour). Also, some gyro sensors have low signal-to-noise ratio. Further, scale factor of some gyro sensors may be temperature sensitive. Measurement error due to such large and instable bias, low signal-to-noise ratio and temperature-sensitive scale factor are significant for MEMS (Micro-Electro Mechanical Systems) gyro sensors in particular, while the MEMS gyro sensors have preferable features for downhole use; cheap, light weight, shock reliable and high temperature resistant. Typically, total measurement error is required to be reduced in the range of less than 1°/hour to determine azimuth with sufficient accuracy like ±a few degrees. Therefore, there is a need for improved methods and systems that are capable of measuring azimuth accurately if such gyro sensors are used, for example, in oilfield and any other harsh environment.

BRIEF SUMMARY OF THE INVENTION

In consequence of the background discussed above, and other factors that are known in the field of oil exploration and development, methods and systems for azimuth measurements using gyro sensors in downhole are provided. In one aspect of the present invention, a method for azimuth measurements using a gyro sensor is provided. The method comprises acquiring a first data from the gyro sensor with an input axis aligned to a first angular orientation parallel to a horizontal plane perpendicular to a gravity direction at a measuring position in downhole; acquiring a second data from the gyro sensor with the input axis flipped to a second angular orientation opposite to the first angular orientation at the measuring point after acquiring the first data; and determining an earth rate component at the first angular orientation based on a difference between the first data and the second data to cancel out bias of the gyro sensor.

In another aspect of the present invention, a method for azimuth measurements using two or three gyro sensors is provided. The input axes of the gyro sensors are orthogonal to each other. The method comprises acquiring a first data from each of the gyro sensors with an input axis aligned to an first angular orientation at a measuring point in downhole; acquiring a second data from each of the gyro sensors with the input axis flipped to a second angular orientation opposite to the first angular orientation at the measuring point after acquiring the first data; and determining an earth rate component at the first angular orientation based on a difference between the first data and the second data to cancel out bias of each of the gyro sensors.

In yet another aspect of the present invention, a method for azimuth measurements using two or three gyro sensors is provided. The input axes of the gyro sensors are orthogonal to each other. The method comprises acquiring a first data from each of the gyro sensors with an input axis aligned to an first angular orientation at a measuring position in downhole, acquiring a second data from each of the gyro sensors with the input axis flipped to a second angular orientation opposite to the first angular orientation at the measuring position after acquiring the first data, determining an earth rate component at the first angular orientations based on a difference between the first data and the second data to cancel out bias of each of the gyro sensors, and repeating acquiring the first data, acquiring the second data and determining the earth rate component after rotating each of the gyro sensors so as to align each input axis of the gyro sensors aligned to another first angular orientation rotated by 90 degrees from the original first angular orientation.

In yet another aspect of the present invention, a method for azimuth measurements using two or three gyro sensors is provided. The input axes of the gyro sensors are orthogonal to each other. The method comprises acquiring a first data from each of the gyro sensors with an input axis aligned to a first angular orientation at a measuring position in downhole, acquiring a second data from each of the gyro sensors with the input axis flipped to a second angular orientation opposite to the first angular orientation at the measuring position after acquiring the first data, determining an earth rate component at the first angular orientation based on a difference between the first data and the second data to cancel out bias of each of the gyro sensors, repeating acquiring the first data, acquiring the second data and determining the earth rate component for each of the gyro sensors at a plurality of discrete angular orientations, fitting a sinusoidal curve to the earth rate components at the plurality of discrete angular orientations, and determining an earth rate vector with respect to a predetermined orthogonal sensor coordinates based on a result of the sinusoidal curve fitting.

The aforementioned method using two or three gyro sensors may comprises acquiring a third data from each of the gyro sensors with the input axis aligned to the same angular orientation as the first angular orientation at the measuring position after acquiring the second data and obtaining an average of the first data and the third data. The acquiring the first, second and third data and obtaining the average of the first and the third data may be repeated for each of the gyro sensors at the another first angular orientation or the plurality of discrete angular orientations. The average may be used instead of the first data for determining the earth rate component. The method may further comprise determining a ratio of sensitivity of a pair of the gyro sensors based on a set of data from the gyro sensors with the input axes aligned to the common first angular orientation, correcting the earth rate components used for determining the earth rate vector based on the ratio of sensitivity, and determining an earth rate vector with respect to a predetermined orthogonal sensor coordinates based on the corrected earth rate components.

In yet another aspect of the present invention, a system for azimuth measurements is provided. The system comprises a housing, two or three gyro sensors having input axes orthogonal to each other, three orthogonal axis accelerometers, a driving mechanism for rotating or flipping the gyro sensors, a controller for controlling the driving mechanism, a data processing unit and a power supply unit. The data processing unit comprises a computer having a processor and a memory. The memory stores at least one program having instructions for the data processing performed in the aforementioned method.

BRIEF DESCRIPTION OF THE DRAWINGS

The accompanying drawings illustrate preferred embodiments of the present invention and are a part of the specification. Together with the following description, the drawings demonstrate and explain principles of the present invention.

DETAILED DESCRIPTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having benefit of the disclosure herein.

Figure 1:
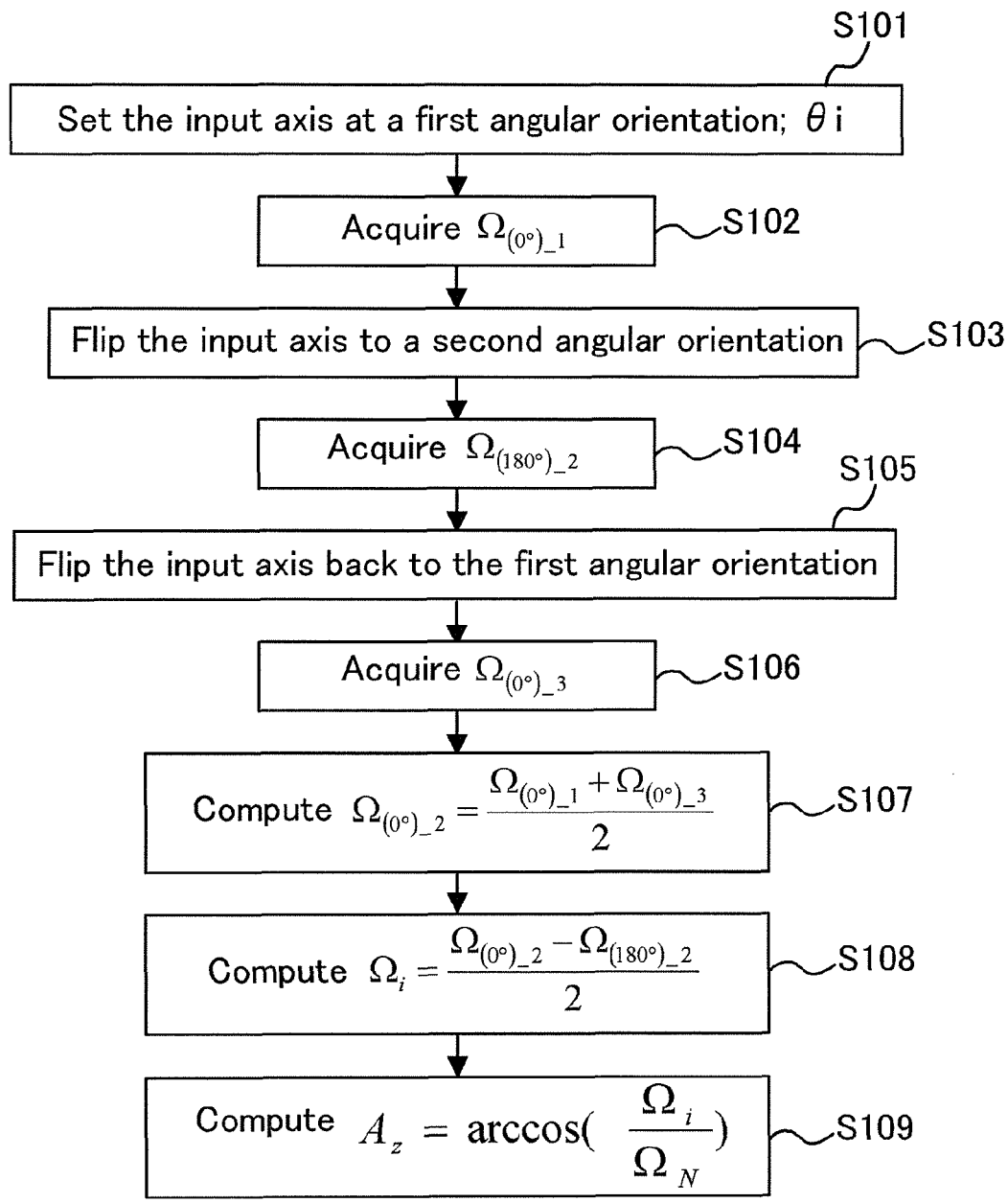
FIG. 1 shows a flow chart of an embodiment of azimuth measurement methods according to the present invention.

FIG. 1 shows a flow chart of an embodiment of azimuth measurement methods according to the present invention. In this method, a system for azimuth measurements including one-axis gyro sensor, which can output signals relating to rotation angular rate, is located at an azimuth measuring position in downhole. The gyro sensor is set so as to align its input axis to a predetermined angular orientation parallel to a horizontal plane perpendicular to a gravity direction. Bias of the gyro sensor is cancelled out by calculating a difference between two measurement data at opposite angular orientations. The one measurement data is obtained from the gyro sensor with its input axis aligned to a first angular orientation ($\theta=0°$). The other measurement data is obtained from the gyro sensor with its input axis flipped to a second angular orientation ($\theta=180°$) opposite to the first angular orientation. Generally, when the input axis of the gyro sensor is flipped, the bias does not change its sign but the earth rate signal does. The azimuth measurements include a plurality of computation procedures based on following equations:

$$\Omega_{(0°)\_1} = \Omega_E + \Omega_{B(t1)} + n, \quad (1)$$

$$\Omega_{(180°)\_2} = -\Omega_E + \Omega_{B(t2)} + n, \quad (2)$$

$$\Omega_{(0°)\_3} = \Omega_E + \Omega_{B(t3)} + n, \quad (3)$$

$$\Omega_{(0°)\_2} = \frac{\Omega_{(0°)\_1} + \Omega_{(0°)\_3}}{2} + n = \Omega_E + \Omega_{B(t2)} + n, \quad (4)$$

and $$\Omega_E = \frac{\Omega_{(0°)\_2} - \Omega_{(180°)\_2}}{2} + n, \quad (5)$$

where $\Omega_{(0°)\_1}$, $\Omega_{(180°)\_2}$, $\Omega_{(0°)\_3}$ are gyro sensor outputs at 0°, 180° and 0° angular orientations;

$\Omega_E$ is an earth rate component;

$\Omega_B$ is gyro bias assumed as a linear function of time (t); and n is gyro random noise.

The measurement procedures include a first data measurement $\Omega_{(0°)\_1}$ from the gyro sensor with the input axis aligned to an first angular orientation at 0°, flipping the input axis of the gyro sensor, and a second data measurement $\Omega_{(180°)\_2}$ from the gyro sensor with the input axis aligned to the second angular orientation at 180° (S101-S104). The measurement procedures also include another flipping to return the input axis to the first angular orientation and a third data measurement $\Omega_{(0°)\_3}$ from the gyro sensor with the input axis aligned to the first angular orientation at 0° (S105, S106). These series of measurements improve the result when the bias is constant or it drifts at a constant rate. An average $\Omega_{(0°)\_2}$ of the first measurement data $\Omega_{(0°)\_1}$ and the third measurement data $\Omega_{(0°)\_3}$ gives the estimated value of bias included in the averaged data at the same timing as that of the second measurement (S107). The earth rate component at the first angular orientation is determined by subtracting the second data from the average of the first and the third data and dividing the difference by two (S108). The above-mentioned data process of measurement procedures using the first, second and third data is hereinafter referred to as "bias-cancel process by flipping".

Each measurement of data from the gyro sensor may take as long as possible to acquire sufficient length of the data to improve signal-to-noise ratio by averaging or an adequate smoothing. A too long data acquisition however causes too much bias uncertainty for a linear interpolation to cancel out. The acquisition time may be determined such that it can cover one cycle of a low frequency bias fluctuation. All three successive measurement steps for the three data $\Omega_{(0°)\_1}$, $\Omega_{(180°)\_2}$ and $\Omega_{(0°)\_3}$ may be completed during the time in which the bias drift can be regarded linear so that the bias is sufficiently cancelled out by the measurement procedures.

The gyro sensor in this embodiment is well pre-calibrated in terms of scale factor before azimuth measurements are performed in downhole. Since the earth rate component ($\Omega_N$) in the north direction on the horizontal plane is known from latitude at the place, azimuth ($A_z$) of the input axis direction can be calculated (S109) with the following equation:

$$A_Z = \arccos\left(\frac{\Omega_E}{\Omega_N}\right). \quad (6)$$

Figure 2:
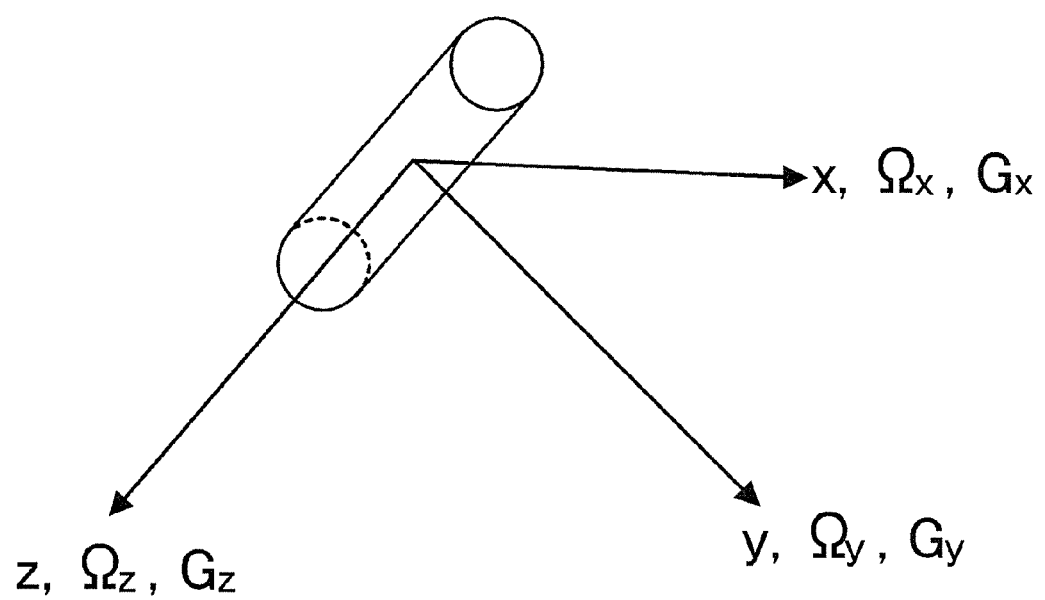
FIG. 2 schematically shows sensor coordinate axes.
Figure 3:
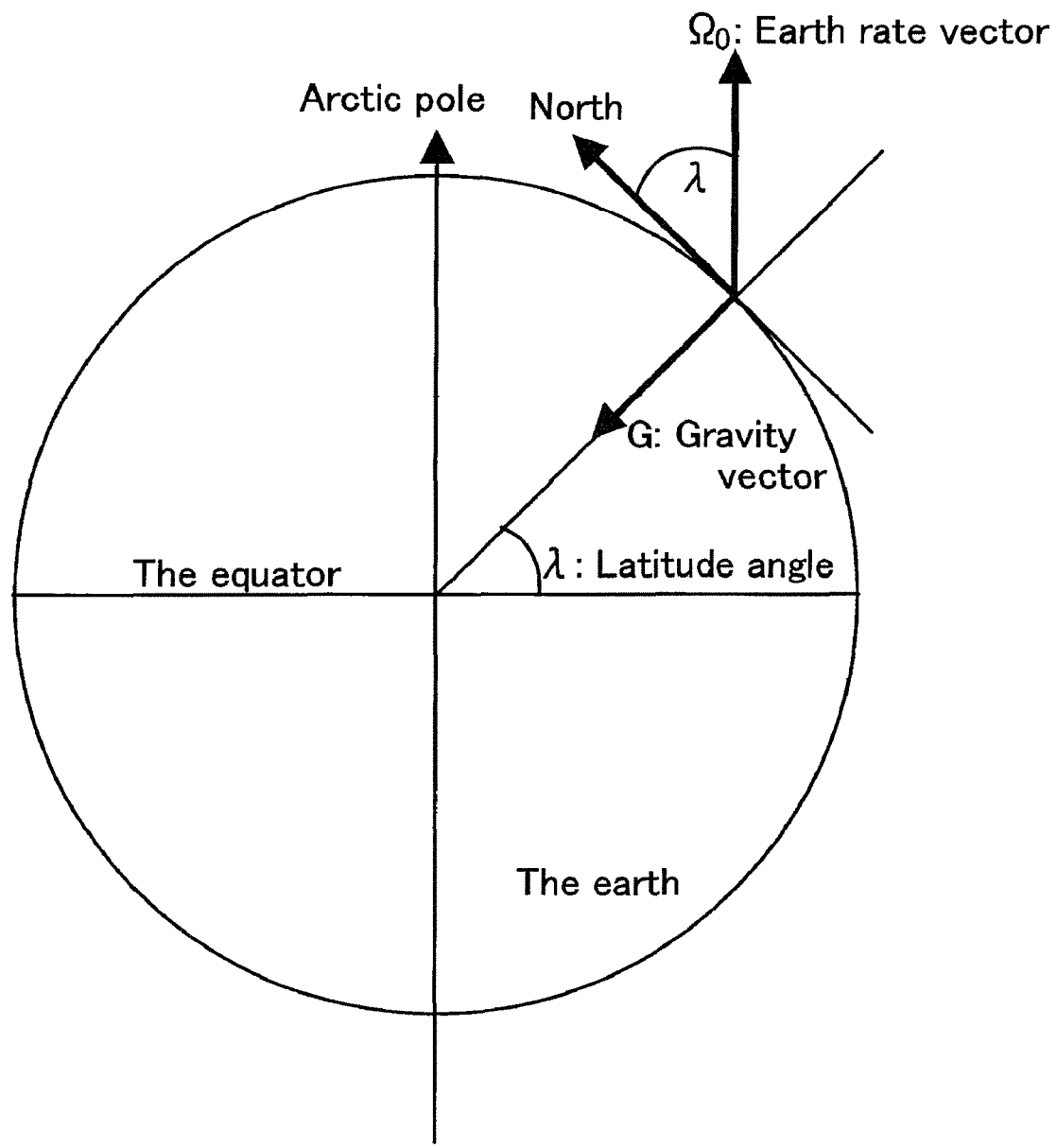
FIG. 3 schematically shows an earth model.
Figure 4:
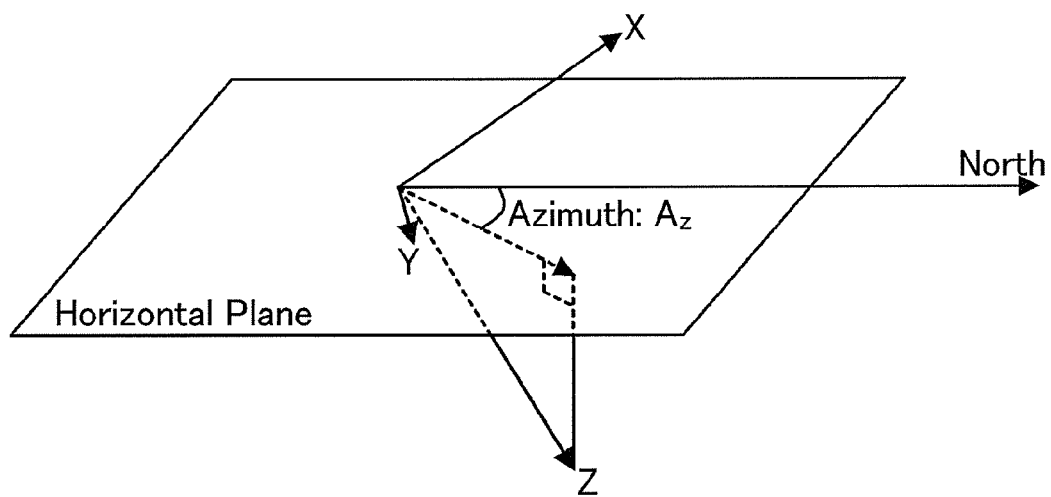
FIG. 4 is an explanatory view of azimuth.

In another embodiment of azimuth measurement methods according to the present invention, a system including three orthogonal axis (x, y, z) gyro sensors and three orthogonal axis (x, y, z) accelerometers is used. These gyro sensors and accelerometers are located at an azimuth measuring position for azimuth measurements in downhole. As shown in FIGS. 2 and 3, the gyro sensors can detect three earth rate components ($\Omega x$, $\Omega y$, $\Omega z$) to determine the earth rate vector ($\Omega_0$). The accelerometers can detect three gravity vector components ($G_x$, $G_y$, $G_z$) to determine the gravity vector (G). Also, the earth rate vector ($\Omega_0$), the north-pointing vector, the gravity vector (G), and latitude angle ($\lambda$) have a relationship as shown in FIG. 3. For azimuth measurements, the gyro sensors measure the three earth rate components ($\Omega x$, $\Omega y$, $\Omega z$) to determine the earth rate vector ($\Omega_0$) with respect to a predetermined sensor coordinate system with three orthogonal axes (x, y, z). The accelerometers measure three gravity vector components (Gx, Gy, Gz) to determine the gravity vector (G) with respect to the sensor coordinate system. As shown in FIG. 4, an azimuth ($A_z$) is defined as an angle between the Z-axis projection and the earth rate vector projection onto the horizontal plane.

Figure 5:
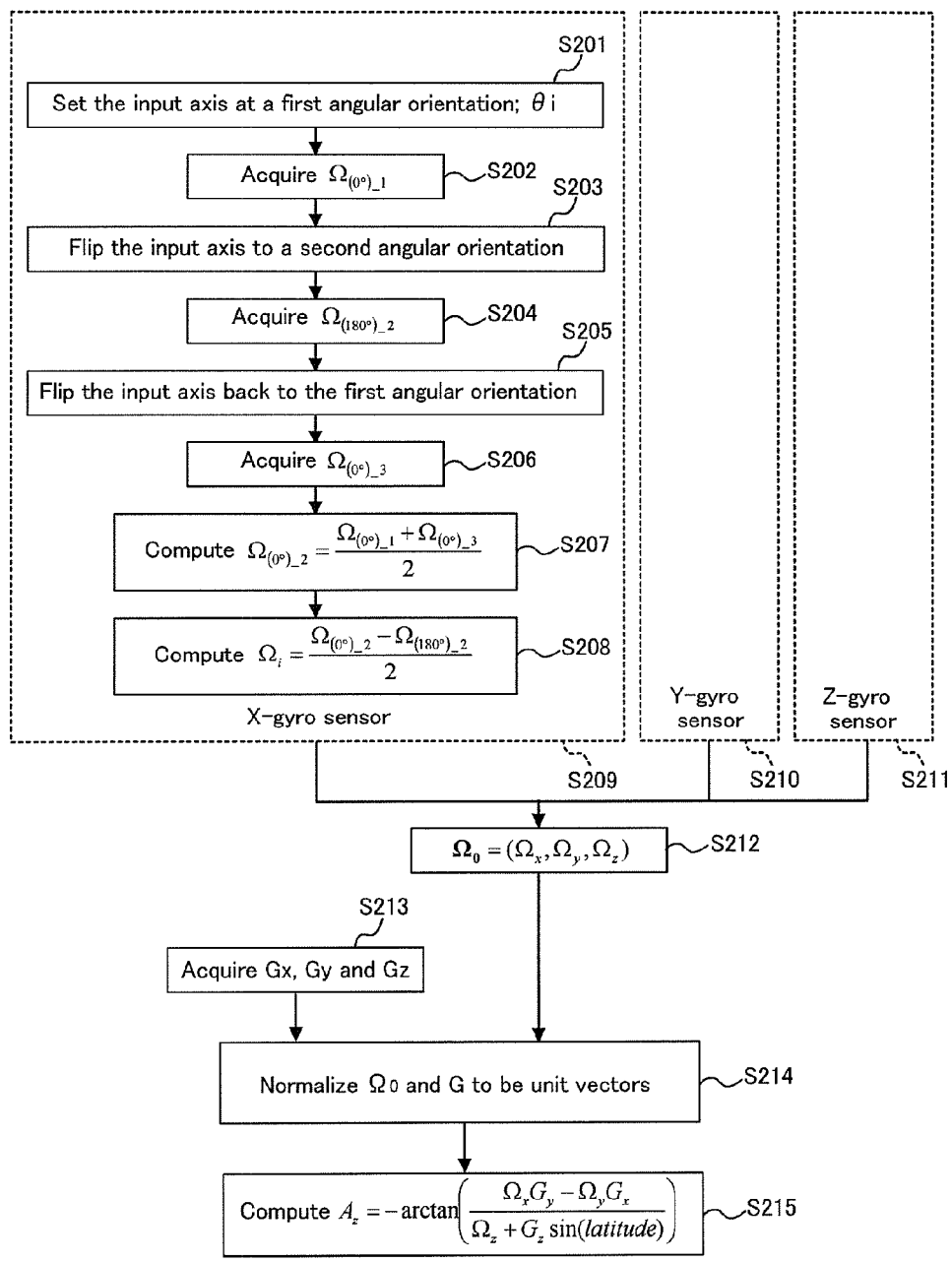
FIG. 5 shows a flow chart of another embodiment of azimuth measurement methods using the three gyro sensors and the three accelerometers.

FIG. 5 shows a flow chart of an azimuth measurement method according to the embodiment using the three gyro sensors and the three accelerometers. In this embodiment, when the gyro sensors are used for azimuth measurements, bias of each gyro sensor is cancelled out by calculating a difference between two measurement data at two opposite angular orientations of the gyro input axis. As mentioned above, when the input axis of the gyro sensor is flipped, the bias does not change its sign but the earth rate signal does. The azimuth measurement includes a plurality of procedures based on the aforementioned equations (1)-(5).

The measurement procedures using one of the gyro sensors located at an azimuth measuring position in downhole include the aforementioned bias-cancel process by flipping (S201-S208).

Each measurement of data from the gyro sensors may take as long as possible to acquire sufficient length of the data to improve signal-to-noise ratio by averaging or an adequate smoothing. A too long data acquisition however causes too much bias uncertainty for a linear interpolation to cancel out. The acquisition time may be determined such that it can cover one cycle of a low frequency bias fluctuation. All three successive measurement steps for the three data $\Omega_{(0°)\_1}$, $\Omega_{(180°)\_2}$ and $\Omega_{(0°)\_3}$ may be completed during the time in which the bias can be regarded linear so that the bias is sufficiently cancelled out by the measurement procedures.

Flipping each of the input axes of three gyro sensors, three orthogonal earth rate components of the earth rate vector are obtained (S209, S210, S211). The number of repeating the measurements may be determined by averaging or smoothing time for noise reduction. With the three earth rate components, the earth rate vector is determined with respect to the orthogonal sensor axis coordinates (S212). In this case, each gyro sensor may be pre-calibrated with sufficient accuracy in terms of the scale factor and the misalignment. In addition to the measurements of earth rate components ($\Omega x$, $\Omega y$, $\Omega z$), three gravity vector components (Gx, Gy, Gz) of the gravity vector at the azimuth measuring position in downhole are acquired from the accelerometers (S213). The measured earth rate vector $\Omega_0$ ($\Omega x$, $\Omega y$, $\Omega z$) and gravity vector G (Gx, Gy, Gz) are normalized to be unit vectors, respectively (S214). By using the normalized earth rate vector and gravity vector, the azimuth ($A_z$) defined with respect to the Z-axis direction in FIG. 4 can be calculated (S215) with the following equation:

$$A_z = -\arctan\left(\frac{\Omega_x G_y - \Omega_y G_x}{\Omega_z + G_z \sin(\text{latitude})}\right). \quad (7)$$

Figure 6:
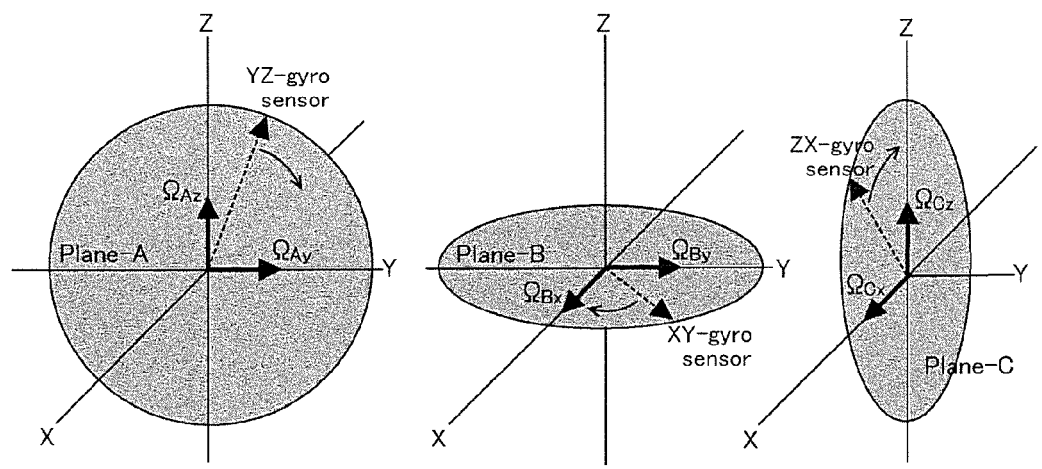
FIG. 6 shows definitions of the rotation angles of the gyro sensors.

In yet another embodiment of azimuth measurement methods according to the present invention, a system including three gyro sensors and three orthogonal axis accelerometers is used, and a scale factor error is calibrated. In this embodiment, a YZ-gyro sensor, an XY-gyro sensor and a ZX-gyro sensor are used as shown in FIG. 6. The input axis of the YZ-gyro sensor is rotatable about X-axis on YZ-plane (plane-A). The input axis of the XY-gyro sensor is rotatable about Z-axis on XY-plane (plane-B). The input axis of the ZX-gyro sensor is rotatable about Y-axis on ZX-plane (plane-C).

Figure 7A:
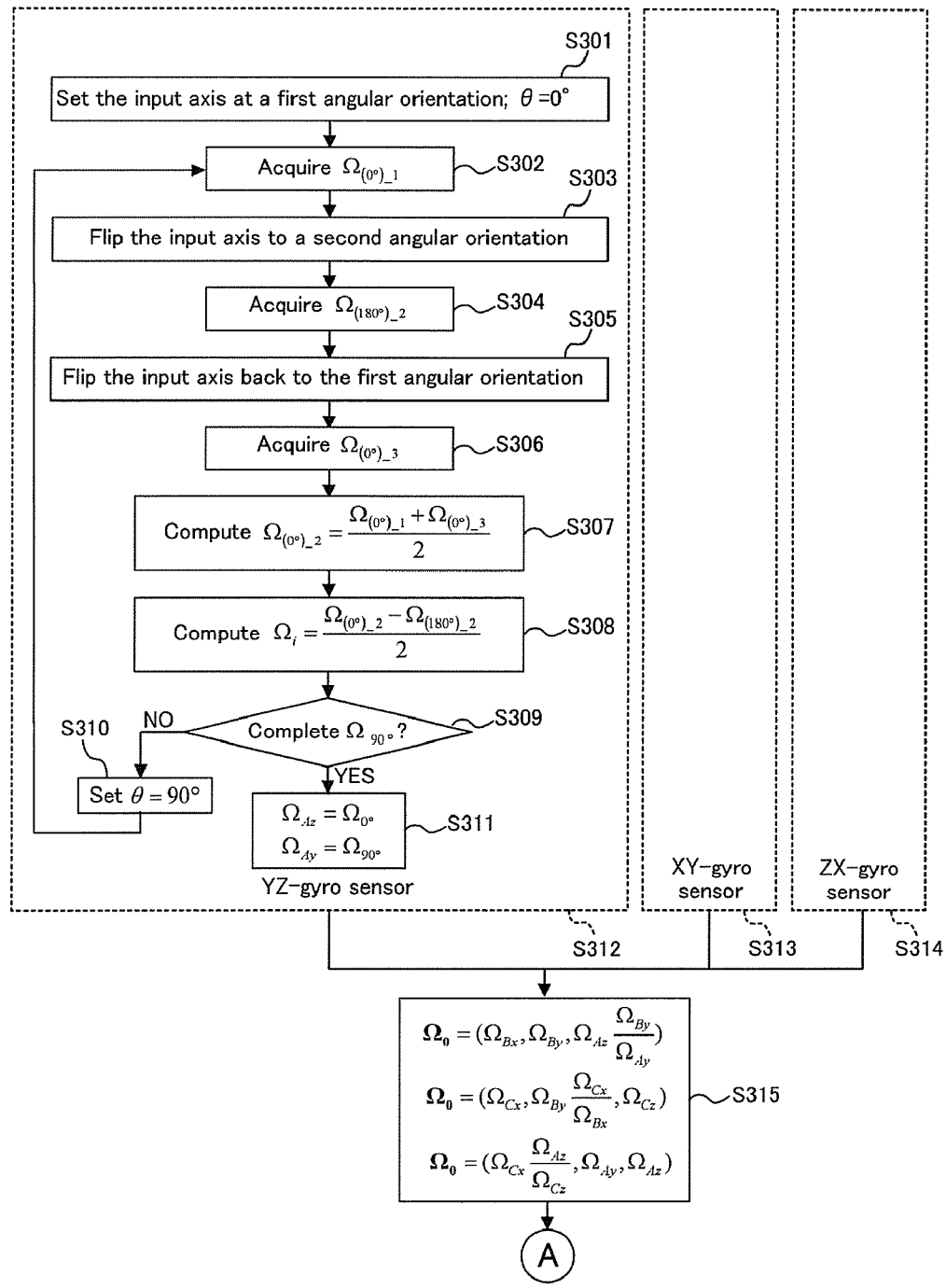
FIGS. 7A and 7B show a flow chart of yet another embodiment of azimuth measurement methods using the three gyro sensors and the three accelerometers.
Figure 7B:
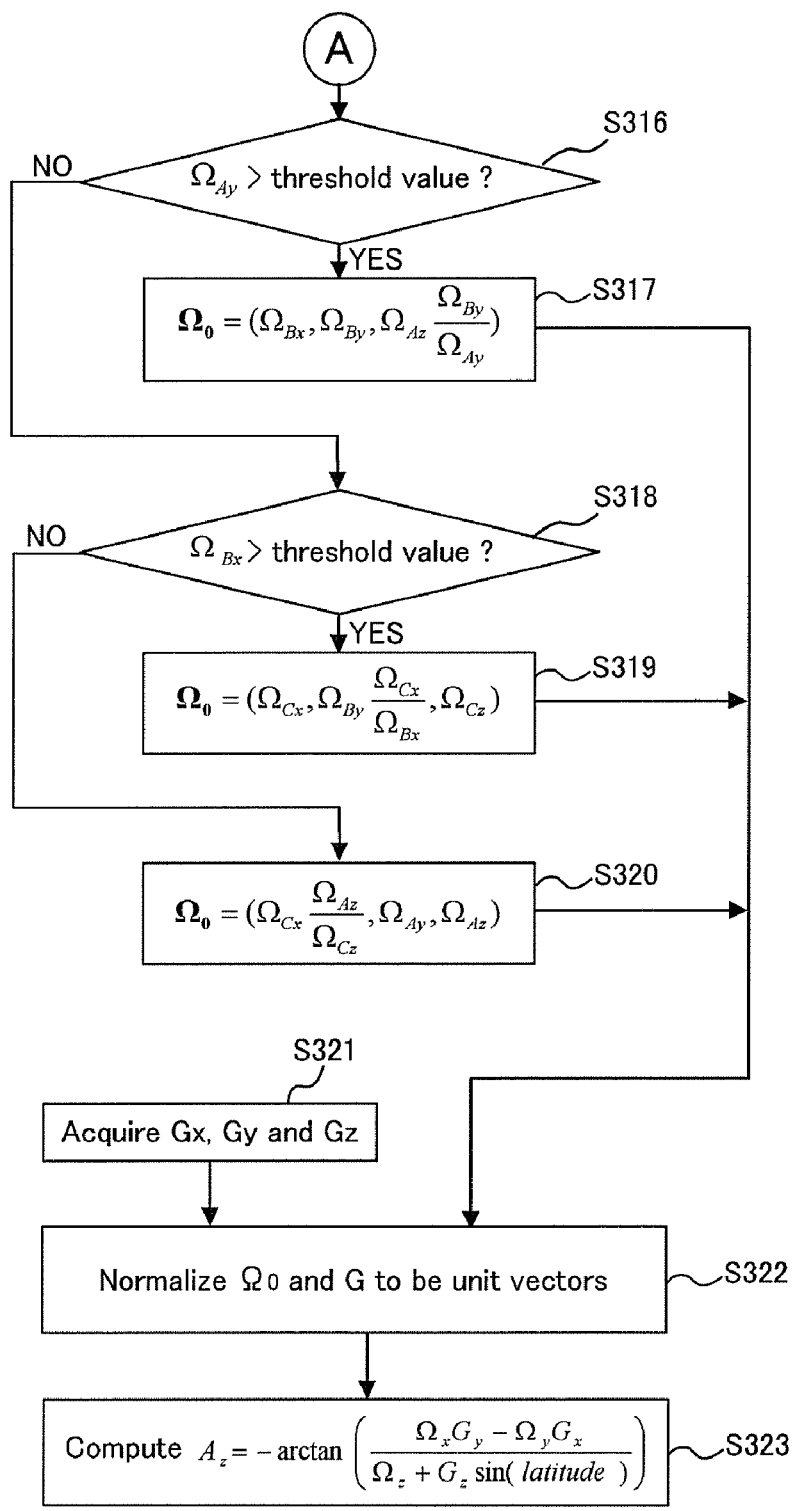

FIGS. 7A and 7B show a flow chart of an azimuth measurement method according to the embodiment using the three gyro sensors and the three accelerometers. In this embodiment, the azimuth measurement includes a plurality of procedures based on the aforementioned equations (1)-(5). The measurement procedures using the YZ-gyro sensor located at an azimuth measuring position in downhole include the aforementioned bias-cancel process by flipping (S201-S208). Then, the YZ-gyro sensor is rotated by 90 degree about X-axis so as to align the input axis to another first angular orientation and the steps of S301-S308 are repeated to obtain the earth rate component $\Omega_{90}°$ at the another first angular orientation of 90° (S309, S310). The two earth rate components of $\Omega_0°$ and $\Omega_{90}°$ are set as $\Omega_{Ay}$ and $\Omega_{Az}$ respectively for determination of the earth rate vector (S311) and the measurement for the YZ-gyro sensor is completed.

The measurements of earth rate components of $\Omega_0°$ and $\Omega_{90}°$ are performed with the XY-gyro sensor so as to set $\Omega_{Bx}$ and $\Omega_{By}$ (S313). The measurements of earth rate components of $\Omega_0°$ and $\Omega_{90}°$ are also performed with the ZX-gyro sensor so as to set $\Omega_{Cz}$ and $\Omega_{Cx}$ (S314). By the above-mentioned measurements, three redundant earth rate vectors calibrated with a ratio of sensitivity between a pair of the gyro sensors can be derived (S315) as shown in following equations:

$$\Omega_0 = \left(\Omega_{Bx}, \Omega_{By}, \Omega_{Az}\frac{\Omega_{By}}{\Omega_{Ay}}\right), \tag{8}$$

$$\Omega_0 = \left(\Omega_{Cx}, \Omega_{By}\frac{\Omega_{Cx}}{\Omega_{Bx}}, \Omega_{Cz}\right), \tag{9}$$

and $$\Omega_0 = \left(\Omega_{Cx}\frac{\Omega_{Az}}{\Omega_{Cz}}, \Omega_{Ay}, \Omega_{Az}\right). \tag{10}$$

The ratio of sensitivity between a pair of the gyro sensors is determined by a ratio of earth rate components obtained at a common first angular orientation. For example, the ratio of sensitivity between the YZ-gyro sensor and the XY-gyro sensor is determined by dividing a Y-axis earth rate component $\Omega_{By}$, another Y-axis earth rate component $\Omega_{Ay}$. In the earth rate vector of Equation (8), a Z-axis earth rate component measured by the YZ-gyro sensor is corrected by multiplied by the ratio of sensitivity ($\Omega_{By}/\Omega_{Ay}$). Dividing an earth rate component by another earth rate component, however, may result in a large azimuth error if an absolute value of the earth rate component in the denominator is too small because each sensor output may contain an error. To avoid this large error, when an earth rate component in the denominator become less than a predetermined threshold value, a corresponding data obtained from other gyro sensor is used based on a selection criterion with following three equations (11), (12) and (13) (See steps of S316-S320 in FIG. 7B).

$$\text{If } \Omega_{Cz} > \text{threshold value, use } \Omega_0 = \left(\Omega_{Cx}\frac{\Omega_{Az}}{\Omega_{Cz}}, \Omega_{Ay}, \Omega_{Az}\right). \tag{11}$$

$$\text{If } \Omega_{Bx} > \text{threshold value, use } \Omega_0 = \left(\Omega_{Cx}, \Omega_{By}\frac{\Omega_{Cx}}{\Omega_{Bx}}, \Omega_{Cz}\right). \tag{12}$$

$$\text{If } \Omega_{Ay} > \text{threshold value, use } \Omega_0 = \left(\Omega_{Bx}, \Omega_{By}, \Omega_{Az}\frac{\Omega_{By}}{\Omega_{Ay}}\right). \tag{13}$$

In addition to the measurements of earth rate components, three gravity vector components (Gx, Gy, Gz) of the gravity vector at the azimuth measuring position in downhole are acquired from the accelerometers (S321). The measured earth rate vector $\Omega_0$ ($\Omega x$, $\Omega y$, $\Omega z$) and gravity vector G (Gx, Gy, Gz) are normalized to be unit vectors, respectively (S322). By using the normalized earth rate vector and gravity vector, the azimuth ($A_z$) defined with respect to the Z-axis direction can be calculated (S323) with the foregoing equation (7).

Figure 8:
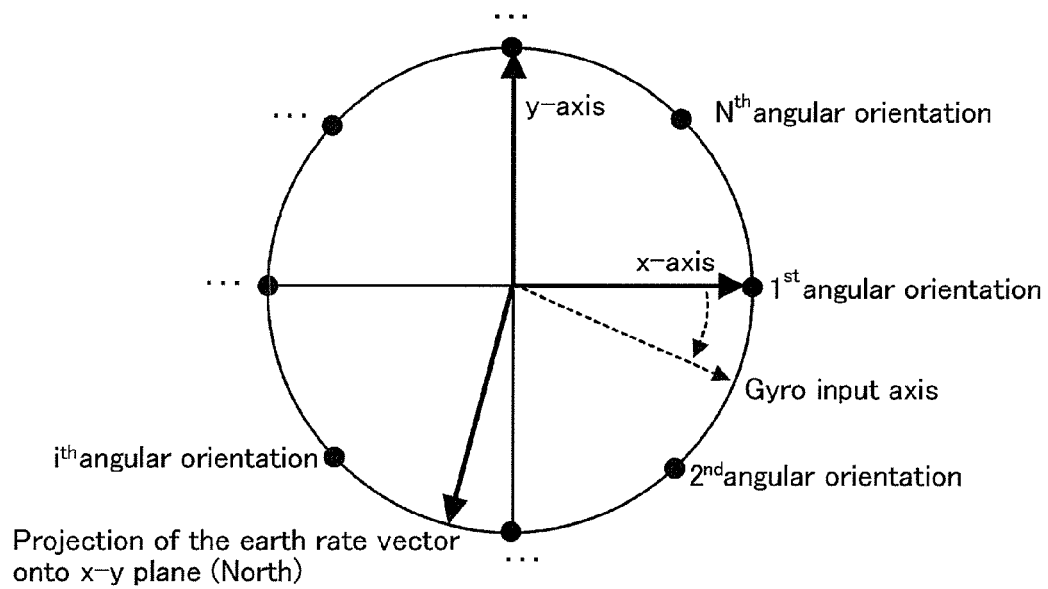
FIG. 8 shows a sinusoidal curve fitting method in the case of XY-axis gyro sensor.
Figure 9:
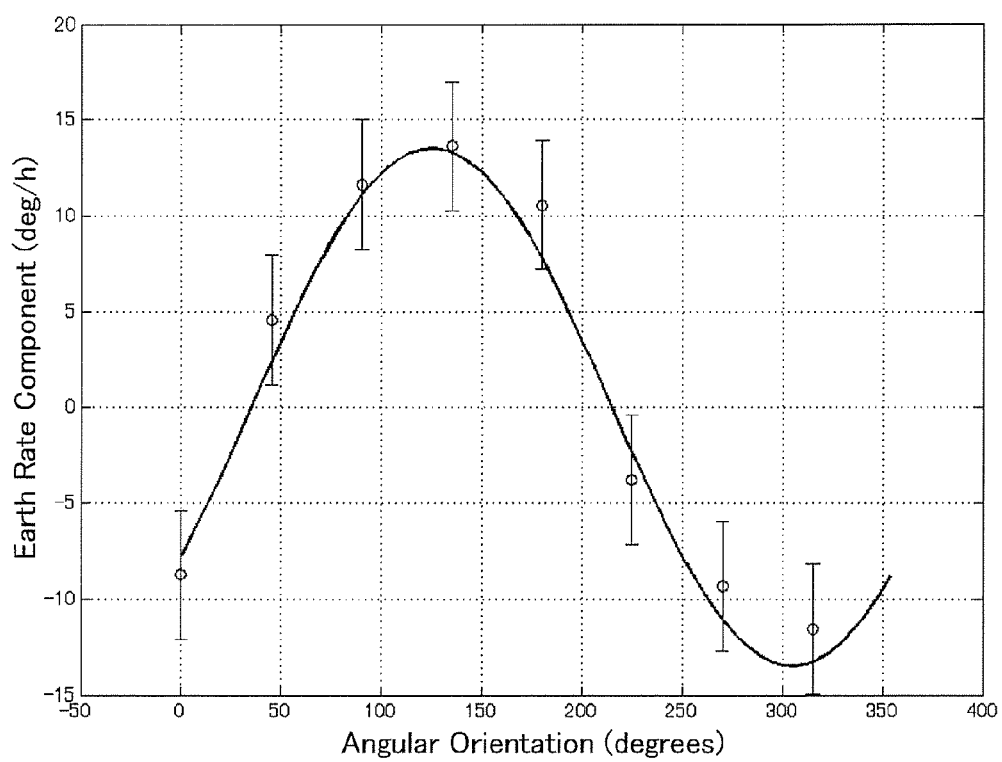
FIG. 9 shows an example of earth rate components obtained by the sinusoidal curve fitting method of FIG. 8.

FIG. 8 shows a plurality of discrete target angular orientations used in another embodiment of the present invention. In this embodiment, if the gyro rotation plane is horizontal, it is possible to determine azimuth by using one gyro sensor (for example, XY-gyro sensor). A stationary measurement of an earth rate component including the bias-cancel process by flipping is performed respectively at every target angular orientation as shown in FIG. 8. That is, data acquisition from the gyro sensor is repeated at each of the discrete target angular orientations divided in the range of 360° on the sensor rotation plane under a stationary condition. A model sinusoidal curve is fit to the data to determine the earth rate components, as shown in FIG. 9. These earth rate components determine the direction of the projection of the earth rate vector onto the horizontal sensor rotation plane. Then azimuth is determined as an angle between this projection and the gyro input axis at 0°.

The present embodiment is especially useful for a relatively low grade and single axis gyro sensor. In this embodiment, continuous rotation of the gyro sensor is not required. The rotation of the gyro sensor is stopped at every target angular orientations to measure an earth rate component under a stationary condition for improving signal-to-noise ratio.

Figure 10A:
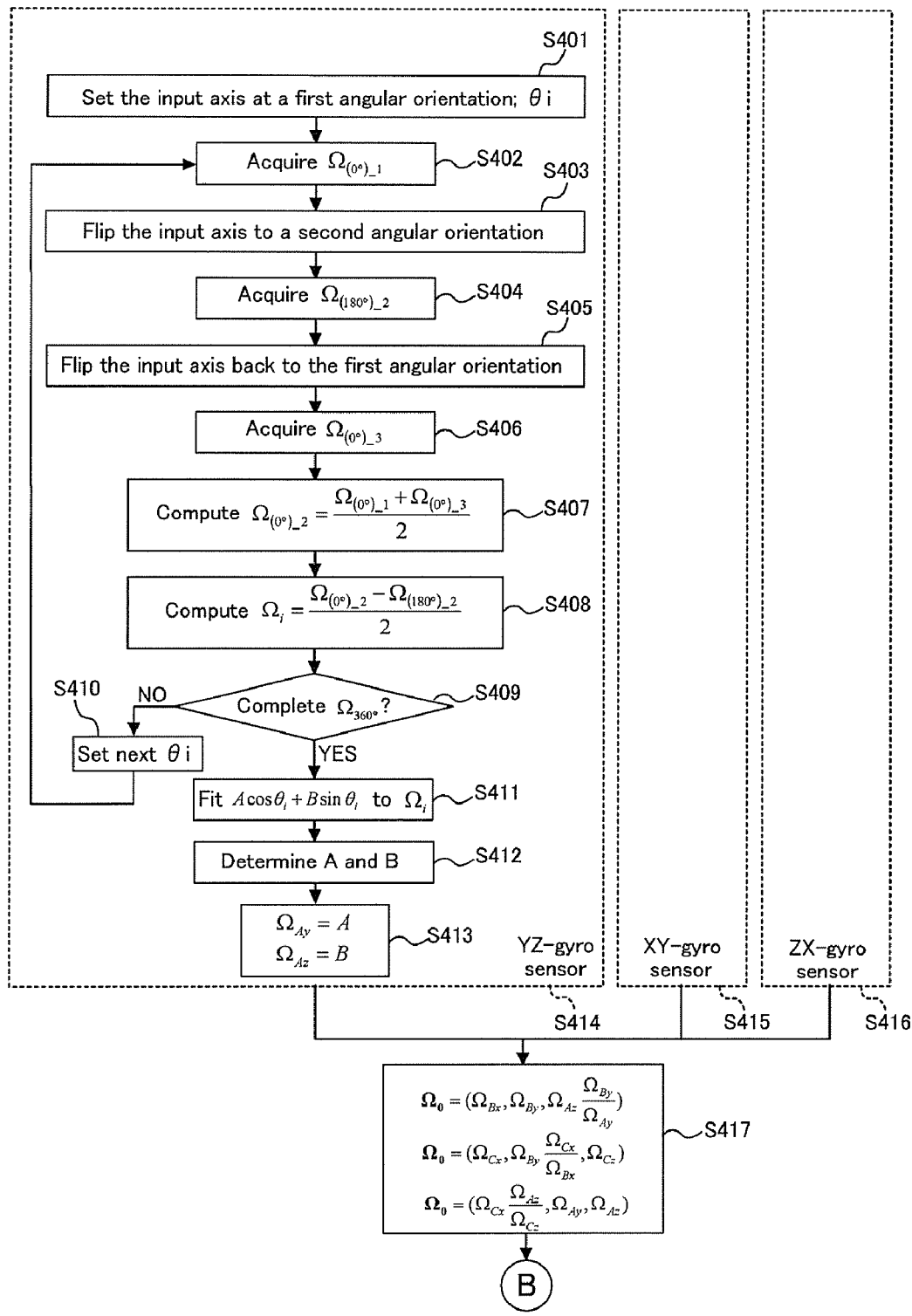
FIGS. 10A and 10B show a flow chart of yet another embodiment of azimuth measurement methods using the three gyro sensors and the three accelerometers.
Figure 10B:
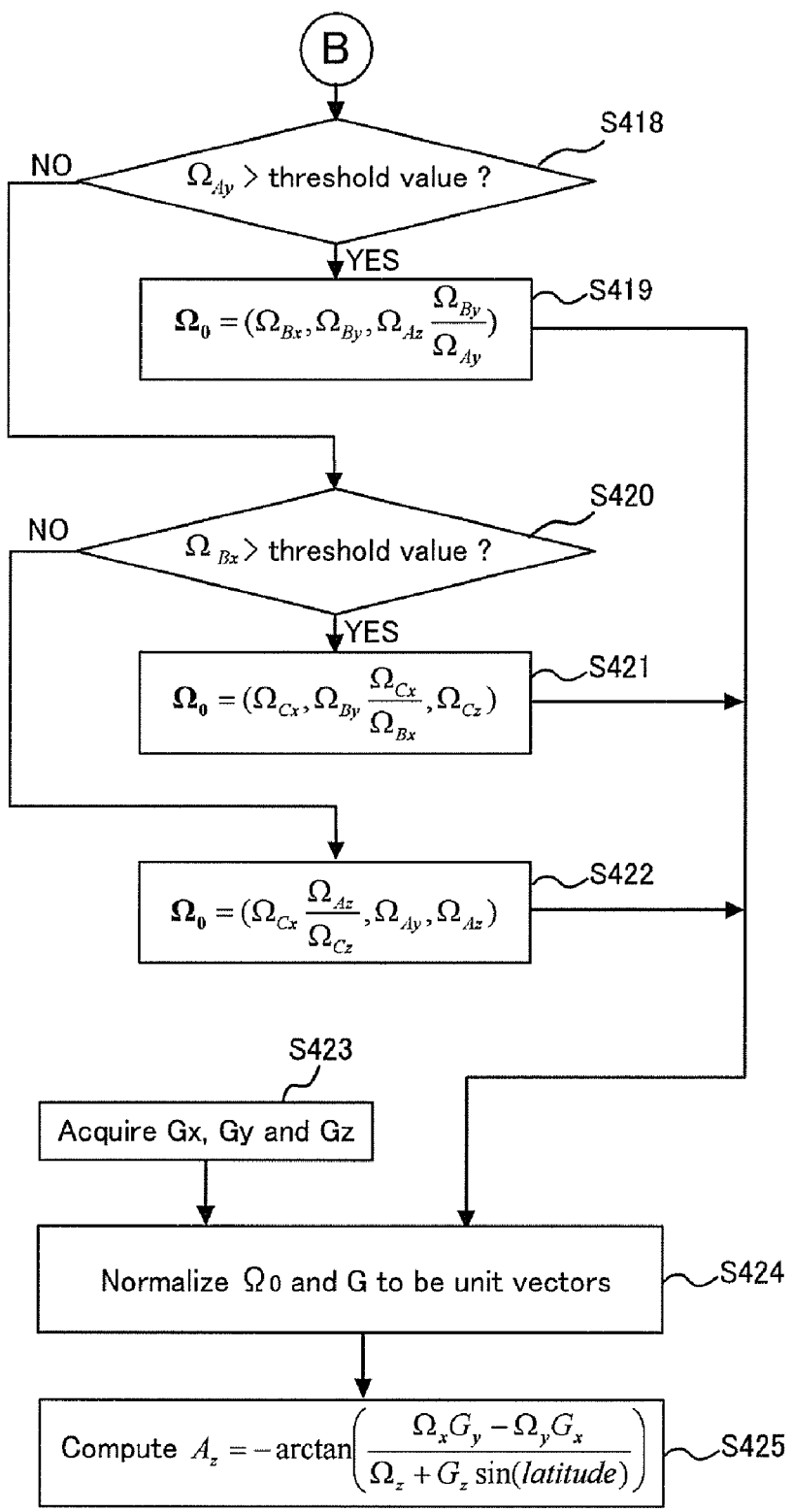

FIGS. 10A and 10B show a flow chart of an azimuth measurement method according to the embodiment using the three gyro sensors with the sensor rotation axis perpendicular to each other and the three orthogonal axis accelerometers. In this embodiment, a calibration with respect to a ratio of sensitivity and a model curve fitting are performed. Firstly, a plurality of measurements of earth rate components is taken in various angular orientations by using three gyro sensors in an arbitrary attitude of the sensor system (S414, S415, S416). In the case of an XY-gyro sensor having a rotation axis of Z-axis, data from the gyro sensor are acquired to measure an earth rate component at an first angular orientation and the gyro sensor is flipped so as to align its input axis to opposite angular orientation to cancel out gyro bias (S401-S408). Then, the gyro sensor is rotated about Z-axis to align its input axis so as to the next angular orientation and repeats the sequence (S402-S408) for measurements of earth rate components on XY plane until the total data covers a plurality of discrete angular orientations in the angular range of 360 degrees (S409, S410). For other gyro sensor (i.e. YZ-gyro sensor or ZX-gyro sensor) having a different rotation axis (X-axis or Y-axis), the same measurements of earth rate components are performed on each sensor rotation plane (YZ plane or ZX plane) (S415, S416).

Thereafter, a sinusoidal curve fitting is applied to the earth rate component data (S411). A sinusoidal curve model for the fitting is expressed as follows:

$$\Omega_i = A\cos\theta_i + B\sin\theta_i, \tag{14}$$

where $\Omega_i$ is an earth rate component at an angular orientation $\theta_i$. A and B are fitting parameters.

If the target angular orientation is on a sensor axis of the sensor coordinates, the earth rate components at the angular orientations of the sensor axes are obtained directly from the fitting parameters, A and B (S412).

In the case of an XY-gyro sensor rotatable on an XY plane (Plane-A), the fitting parameters A and B are expressed (S413) as follows:

$$A = \Omega_{Ax}, \tag{15}$$

$$B = \Omega_{Ay}, \tag{16}$$

where $\Omega_{Ax}$ is an X-axis component of the earth rate vector measured by the XY-gyro sensor, and $\Omega_{Ay}$ is a Y-axis component of the earth rate vector measured by the XY-gyro sensor (S414).

In the case of a YZ-gyro sensor rotatable on a YZ plane (Plane-B), the fitting parameters A and B are expressed as follows:

$$A = \Omega_{By}, \tag{17}$$

$$B = \Omega_{Bz}, \quad (18)$$

where $\Omega_{By}$ is a Y-axis component of the earth rate vector measured by the YZ-gyro sensor, and $\Omega_{Bz}$ is a Z-axis component of the earth rate vector measured by the YZ-gyro sensor (S415).

The two values of $\Omega_{Ay}$ and $\Omega_{By}$ may be different because of a discrepancy of in sensor sensitivities between the XY gyro sensor and the YZ gyro sensor.

A ZX-gyro sensor rotatable on the ZX plane (Plane-C) can be also used to determine the fitting parameters. In the case of the ZX-gyro sensor, the fitting parameters A and B are expressed as follows:

$$A = \Omega_{Cz}, \quad (19)$$

$$B = \Omega_{Cx}, \quad (20)$$

where $\Omega_{Cz}$ is a Z-axis component of the earth rate vector measured by the ZX-gyro sensor, and $\Omega_{Cx}$ is an X-axis component of the earth rate vector measured by the ZX-gyro sensor (S416).

As mentioned above, earth rate components are then determined by the above equations (S414-S416). Among the three gyro sensors, three pairs of the two fitting parameters determined on common sensor axes can be selected. Each pair determines the same earth rate vector $\Omega_0$ (S417), as shown in equations (21), (22) and (23).

$$\Omega_0 = \left( \Omega_{Bx}, \Omega_{By}, \Omega_{Az} \frac{\Omega_{By}}{\Omega_{Ay}} \right), \quad (21)$$

$$\Omega_0 = \left( \Omega_{Cx}, \Omega_{By} \frac{\Omega_{Cx}}{\Omega_{Bx}}, \Omega_{Cz} \right), \quad (22)$$

$$\Omega_0 = \left( \Omega_{Cx} \frac{\Omega_{Az}}{\Omega_{Cz}}, \Omega_{Ay}, \Omega_{Az} \right). \quad (23)$$

In the equations (21), (22) and (23), each ratio of sensitivities between two gyro sensors selected among the XY-gyro sensor, YZ-gyro sensor and ZX-gyro sensor is determined by dividing an earth rate component by another earth rate component. To avoid large azimuth error when the absolute value of the earth rate in the denominator is too small, a corresponding data obtained from other gyro sensor is used based on a selection criterion with the foregoing three equations (11), (12) and (13) (See steps of S418-S3422 in FIG. 10B).

As illustrated in FIG. 4, the earth rate vector in the sensor axis coordinate is then projected onto the horizontal plane to determine an azimuth of a target direction at certain latitude. The horizontal plane is determined as a plane perpendicular to a gravity vector. The gravity vector G can be determined with three orthogonal accelerometers (S423). The measured earth rate vector $\Omega_0$ and gravity vector G are normalized to be unit vectors, respectively (S424).

When the sensor system takes an arbitrary attitude, two orthogonal sensor axes (Z-axis and X-axis) are not always on the horizontal surface. Projections of those axes onto the horizontal surface may be used. However, the projection axes cannot be always perpendicular to each other. Therefore, instead of using projection of the actual X-axis, an axis perpendicular to the projection of the Z-axis on the horizontal plane is constructed and used as two orthogonal axes on the horizontal plane with the projection of Z-axis. The projection unit vector of the Z-axis onto the horizontal plane is $$z' = \frac{z - z \cdot GG}{|z - z \cdot GG|} = \frac{z - G_z G}{\sqrt{1 - G_z^2}}. \quad (24)$$

The perpendicular unit vector of the Z-axis projection onto the horizontal surface, x', is $$x' = \frac{G \times z}{\sqrt{G \times z}} = \frac{G \times z}{\sqrt{1 - G_z^2}}. \quad (25)$$

The z' component of $\Omega$ is $$\Omega_{z'} = \Omega \cdot z' \quad (26)$$

$$= \frac{\Omega \cdot (z - G_z G)}{\sqrt{1 - G_z^2}}$$

$$= \frac{\Omega_z - G_z(\Omega \cdot G)}{\sqrt{1 - G_z^2}}.$$

The x' component of $\Omega$ is $$\Omega_{x'} = \Omega \cdot x' \quad (27)$$

$$= \frac{\Omega \cdot (G \times z)}{\sqrt{1 - G_z^2}}$$

$$= \frac{\Omega_x G_y - \Omega_y G_x}{\sqrt{1 - G_z^2}}.$$

The azimuth ($A_z$) is then determined (S425 in FIG. 10B) using the following equation:

$$A_z = -\arctan\left( \frac{\Omega_{x'}}{\Omega_{z'}} \right) \quad (28)$$

$$= -\arctan\left( \frac{\Omega_x G_y - \Omega_y G_x}{\Omega_z - G_z(\Omega \cdot G)} \right)$$

$$= -\arctan\left( \frac{\Omega_x G_y - \Omega_y G_x}{\Omega_z + G_z \sin(\text{latitude})} \right).$$

Note that if the denominator in the blanket vanishes, arctangent gives 90 degrees whatever the numerator is. This corresponds to the situation that the Z-axis is parallel to the gravity vector and azimuth cannot be defined because no Z-axis projection is available on the horizontal surface.

If Y-axis exactly parallel to the gravity vector, $G_x = G_z = 0$ and $G_y = 1$. Therefore, the azimuth ($A_z$) can be determined by the following simplified equation:

$$A_z = -\arctan\left( \frac{\Omega_x}{\Omega_z} \right), \quad (29)$$

where $\Omega_x$ and $\Omega_z$ are earth rate components when x- and y-axes are on a horizontal surface.

If gyro sensor outputs and accelerometer outputs contain errors, $\Delta\Omega_x$, $\Delta\Omega_y$, $\Delta\Omega_z$, $\Delta G_x$, $\Delta G_y$ and $\Delta G_z$, the azimuth error is $$\Delta A_z = -\Delta\left[\arctan\left(\frac{\Omega_{y'}}{\Omega_{x'}}\right)\right] \quad (30)$$

$$= -\frac{(\Omega_z - G_z(\Omega \cdot G))\begin{pmatrix} \Delta\Omega_x G_y + \Omega_x \Delta G_y - \\ \Delta\Omega_y G_x - \Omega_y \Delta G_x \end{pmatrix} +}{(\Omega_x G_y - \Omega_y G_x)^2 + (\Omega_z - G_z(\Omega \cdot G))^2}.$$

$$\Delta A_{zmax} = -\frac{(\Omega_z - G_z(\Omega \cdot G))\begin{pmatrix} \Delta\Omega_x G_y + \Omega_x \Delta G_y + \\ \Delta\Omega_y G_x + \Omega_y \Delta G_x \end{pmatrix} +}{(\Omega_x G_y - \Omega_y G_x)^2 + (\Omega_z - G_z(\Omega \cdot G))^2}. \quad (31)$$

Figure 11:
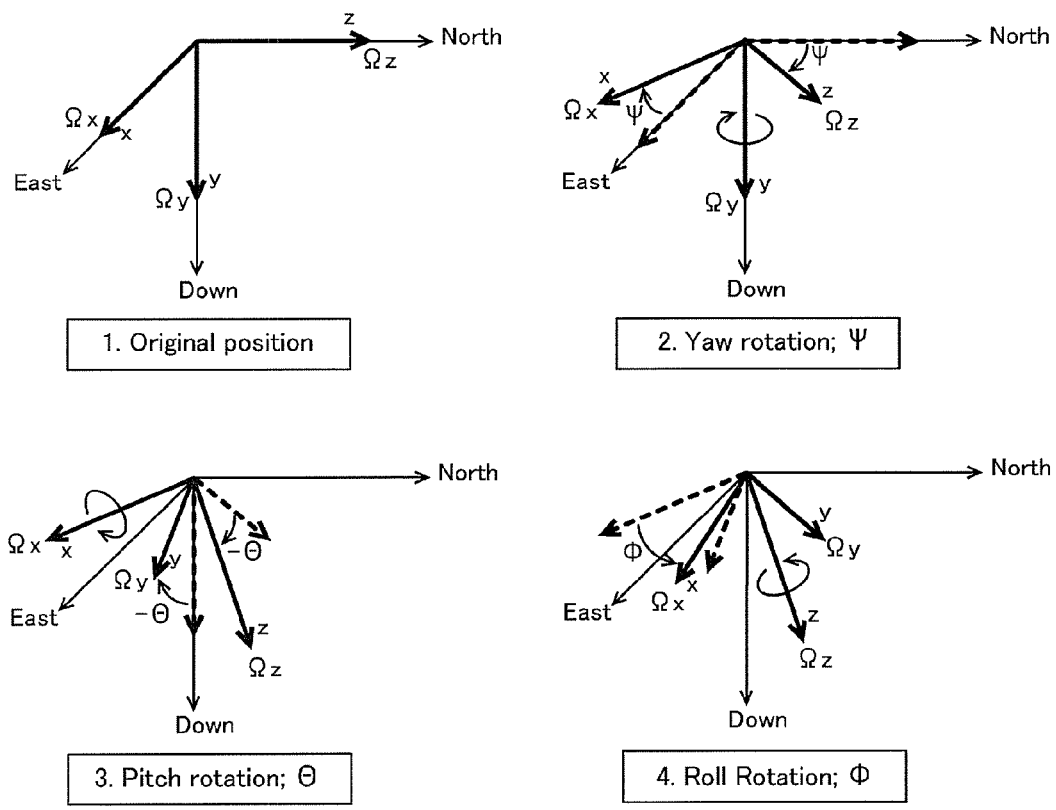
FIG. 11 shows definitions of rotation angles of a gyro sensor coordinate frame.

FIG. 11 shows definitions of rotation angles of a gyro sensor coordinate frame including three orthogonal axis gyro sensors and three orthogonal axis accelerometers used in computer simulation. The rotation angles are defined according to a North-East-Down (NED) coordinate system fixed on the earth. The computer simulation is performed to simulate gyro error propagation to the earth rate vector and then to azimuth when a sensor system including the gyro sensor takes various attitudes with respect to the gravity direction. In order to demonstrate that the present method is independent of gyro scale factor accuracy, it is also assumed that an XY gyro sensor has −10% scale factor error, a YZ gyro sensor has +10% scale factor error, and a ZX gyro sensor has 0% scale factor error.

Figure 12:
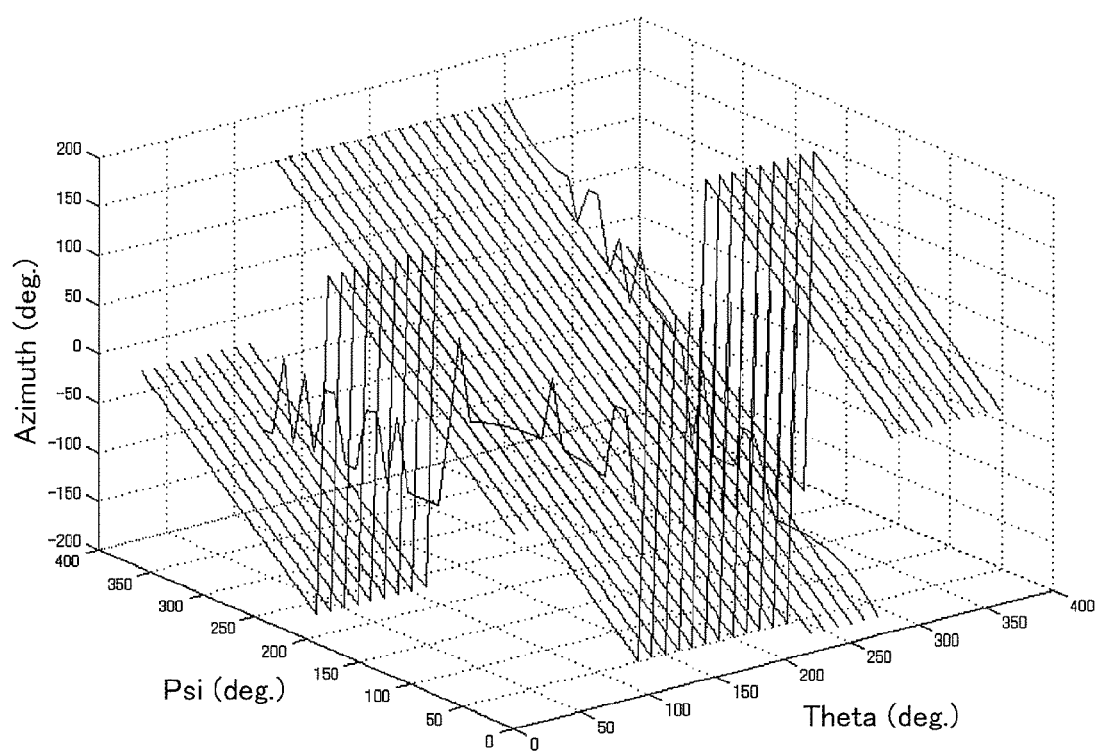
FIG. 12 shows azimuth computed using the equations of earth rate vector $\Omega_0$.

FIG. 12 shows an azimuth computed by using the equations (21), (22) and (23) of earth rate vector $\Omega_0$ and the equation (28) of azimuth for all combination of pitch rotation angle ($\Theta$) and yaw rotation angle ($\Psi$) at roll rotation angle ($\Phi$) of 0°. In azimuth computation of FIG. 12, even though wrong scale factors are assumed in three gyro sensors intentionally, the present method can compute correct azimuth in any inclination. When Z-axis is at $\Theta$=90° and 270°, azimuth is not defined in principle. The computation simulation can verify that the present method computes correct azimuth for any incremental angles of the roll rotation angle $\Phi$.

As discussed above, dividing an earth rate component by another earth rate component, however, may result in a large azimuth error if an absolute value of the earth rate in the denominator is too small. To avoid this disadvantage, when gyro components in the denominator become less than a predetermined threshold value, corresponding data obtained from other gyro sensor are used based on the foregoing equations (11), (12) and (13) (See steps of S418-S422 in FIG. 10B).

Figure 13:
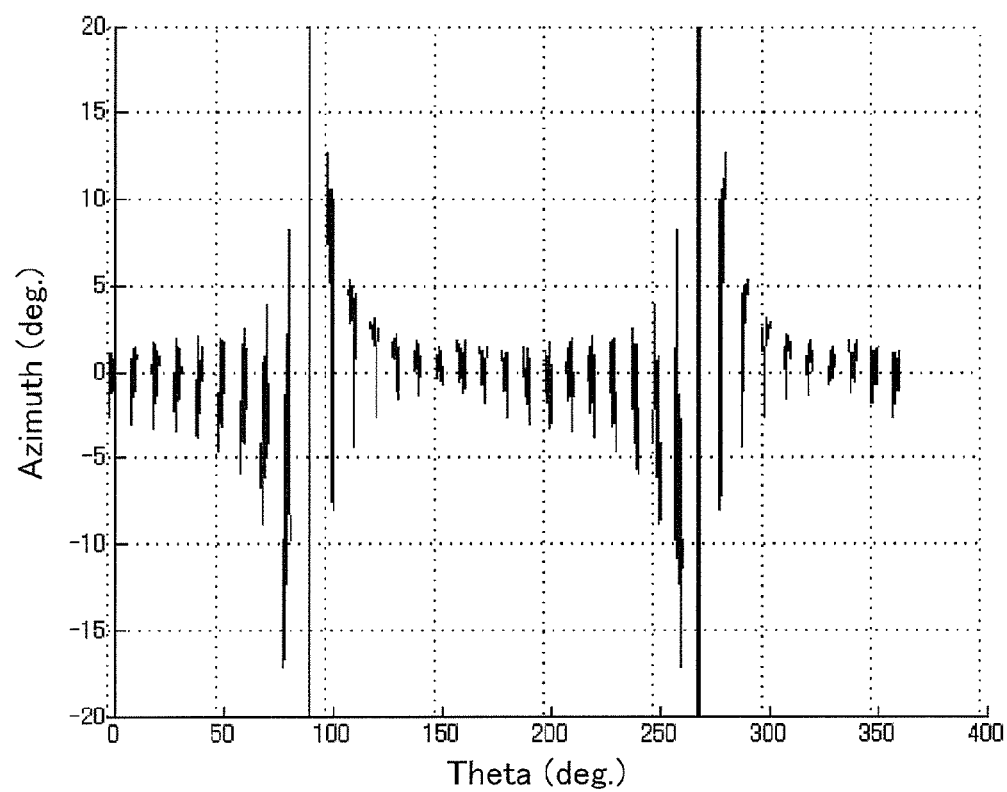
FIG. 13 shows a theta angle dependency of azimuth error obtained by computer simulation.
Figure 14:
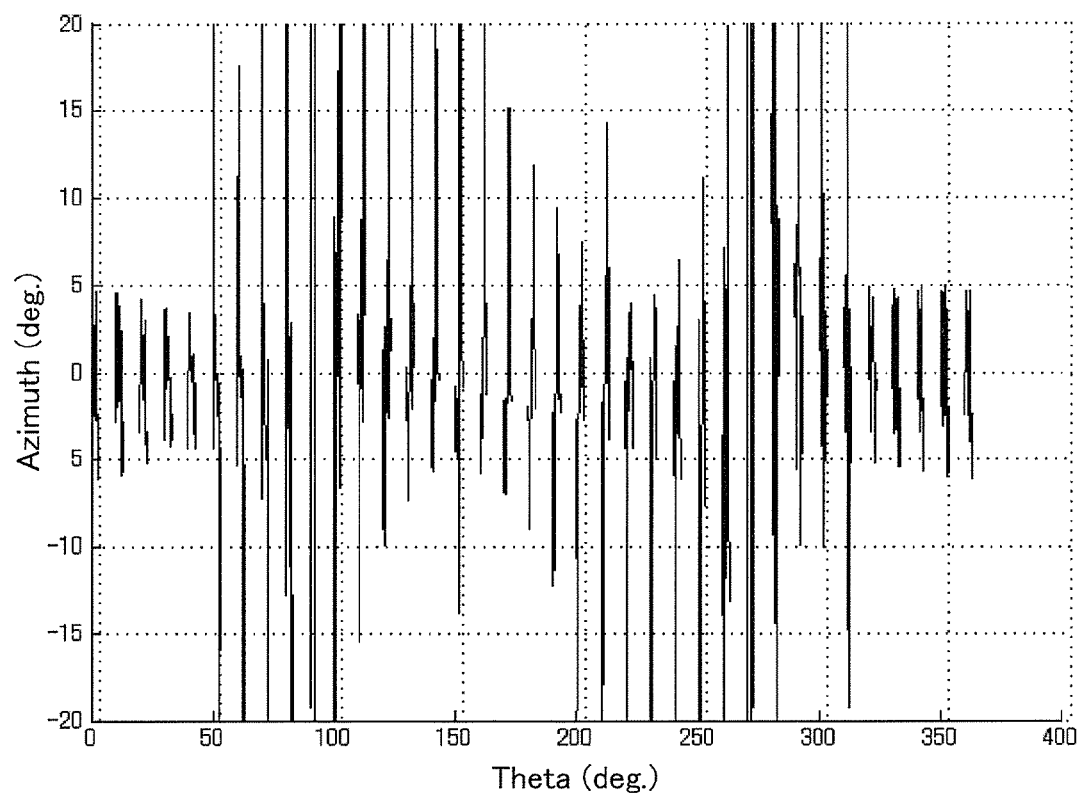
FIG. 14 shows a computer simulation of a comparative example.
Figure 15:
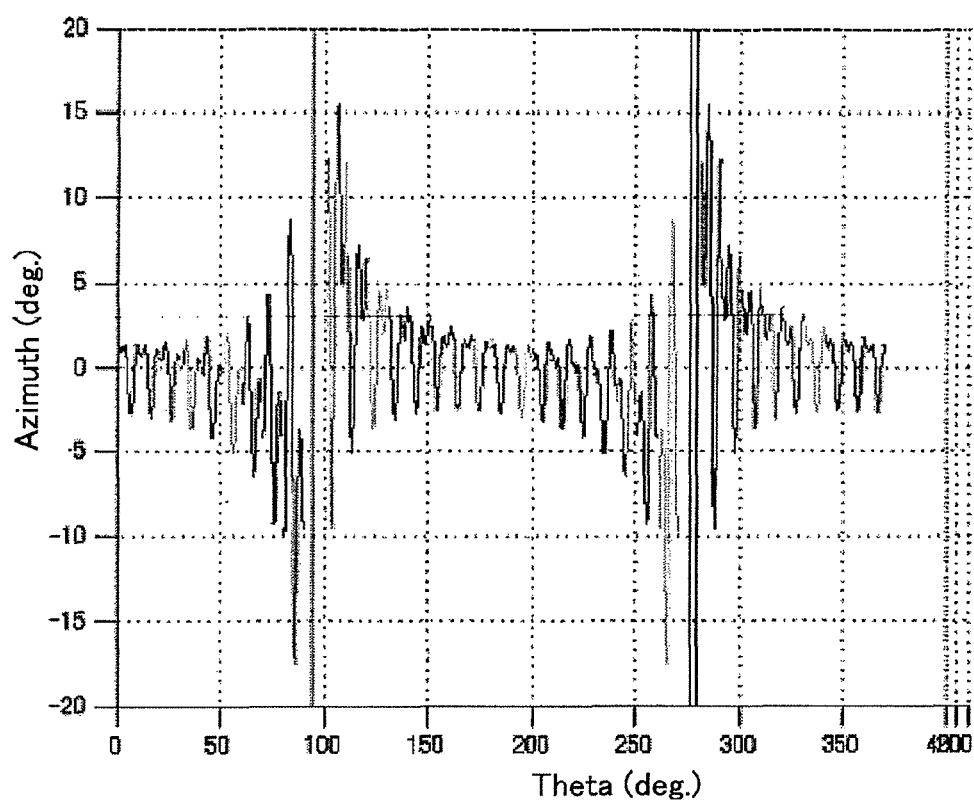
FIG. 15 shows another computer simulation of a comparative example.

To verify this method using the equations (11), (12) and (13) in a simulation, it is assumed that the gyro sensor has error of $\Delta\Omega$=0.5°/h and the accelerometer has error of $\Delta G$=0.001G. The threshold value of 7.5°/h is set in this simulation. The simulation result is in FIG. 13 shows a theta angle dependency of azimuth error. The errors in FIG. 13 are much smaller than a simulation result of a comparative example in FIG. 14. In the comparative example, no calibration with the ratio of sensitivity is performed and it is assumed that the YZ-axis gyro sensor has scale factor error of +5%, the ZX-axis gyro sensor has scale factor error of −5% and the accelerometer has error of $\Delta G$=0.001G. The errors in FIG. 13 are similar to or rather slightly better than that of another comparative example in FIG. 15, where three gyro sensors with well calibrated scale factors are used and without steps of S418-S422 in FIG. 10B. Note that azimuth error increases to divergence when the input axis of Z-axis gyro sensor approaches the vertical direction. This is, however, not a problem because the sensor system including at least two orthogonal axis gyro sensors always can determine the earth rate vector direction.

Figure 16:
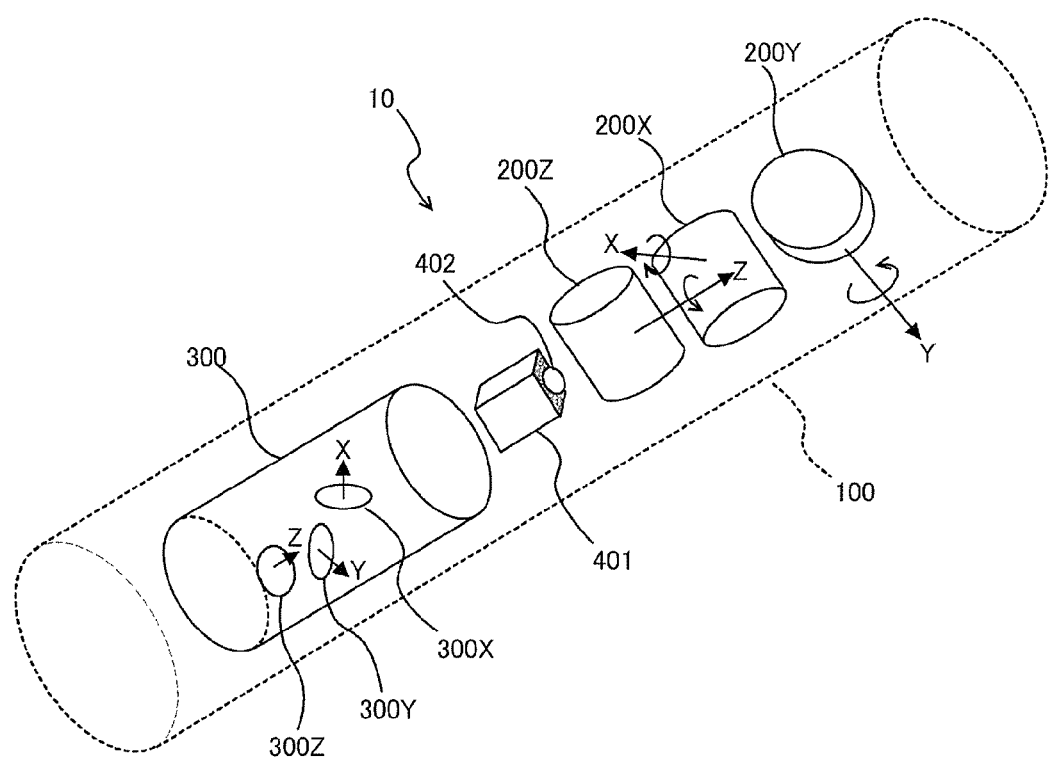
FIG. 16 shows a sensor system including three orthogonal axis gyro sensors and three orthogonal axis accelerometers.
Figure 17:
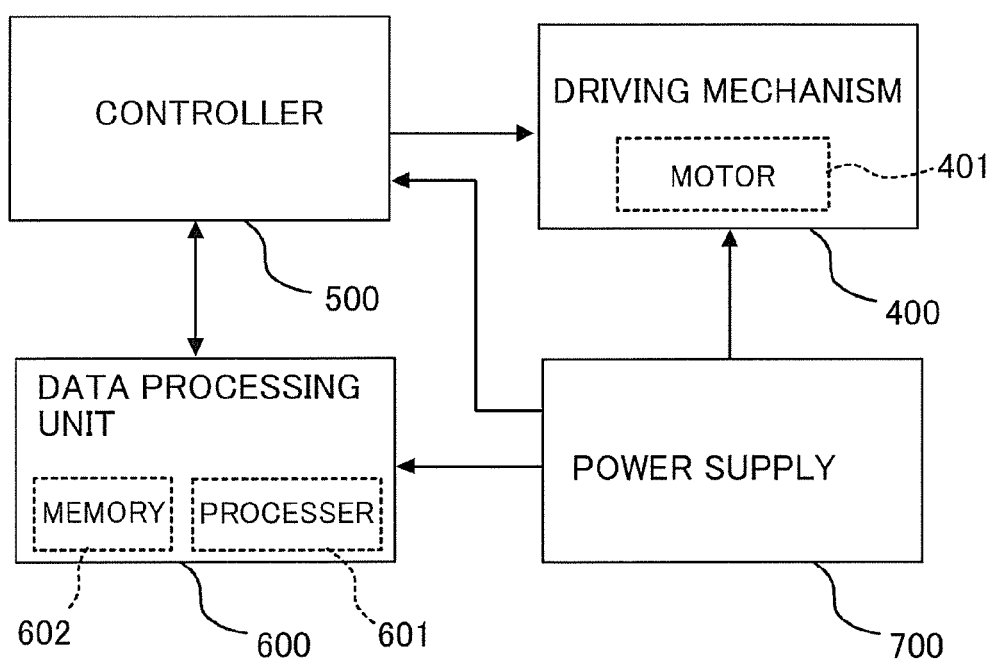
FIG. 17 shows a block diagram of electric system of the sensor system.

FIG. 16 shows an example of a sensor system to realize the present method described above. FIG. 17 shows a block diagram of electric system of the sensor system. The sensor system 10 includes a housing 100, three orthogonal axis gyro sensors 200X, 200Y, 200Z, an accelerometer module 300 including three orthogonal axis accelerometers 300X, 300Y, 300Z, a driving mechanism 400 for the gyro sensors to flip and/or rotate each input axis of the gyro sensors. The driving mechanism 400 flips and/or rotates each of the gyro sensors using a single motor 401 (preferably a step motor) and gears to transport the rotating force to each rotation axis of the gyro sensors. The sensor system 10 also includes a controller 500 for the driving mechanism, a data processing unit 600 and a power supply unit 700. The data processing unit 600 includes a computer having a processor 601 and a memory 602. The memory 602 stores a program having instructions for the azimuth measurements. The gyro sensors 200X, 200Y, 200Z, the accelerometers 300X, 300Y, 300Z, the driving mechanism 400, the controller 500 for the driving mechanism 400, the data processing unit 600 and the power supply unit 700 are installed in the housing 100.

An angle position sensor 402 may be preferably provided in order to detect a rotation angle position of a rotation axis of the motor 401 or the gyro sensor. By using the detected rotation angle position, the angular orientation of each input axis of the gyro sensors 200X, 200Y, 200Z can be identified. The angle position sensor 402 may be used to monitor an angular rotation position of the motor axis. This monitoring the angular rotation position allows the sensor system 10 to return each gyro sensor at a home position and set each input axis of the gyro sensors parallel to a predetermined home angular orientation (original angular orientation), whenever the system power is turned on. In addition, it is important to monitoring the angular rotation position during the azimuth measurement for reliability of the sensor system.

Figure 18:
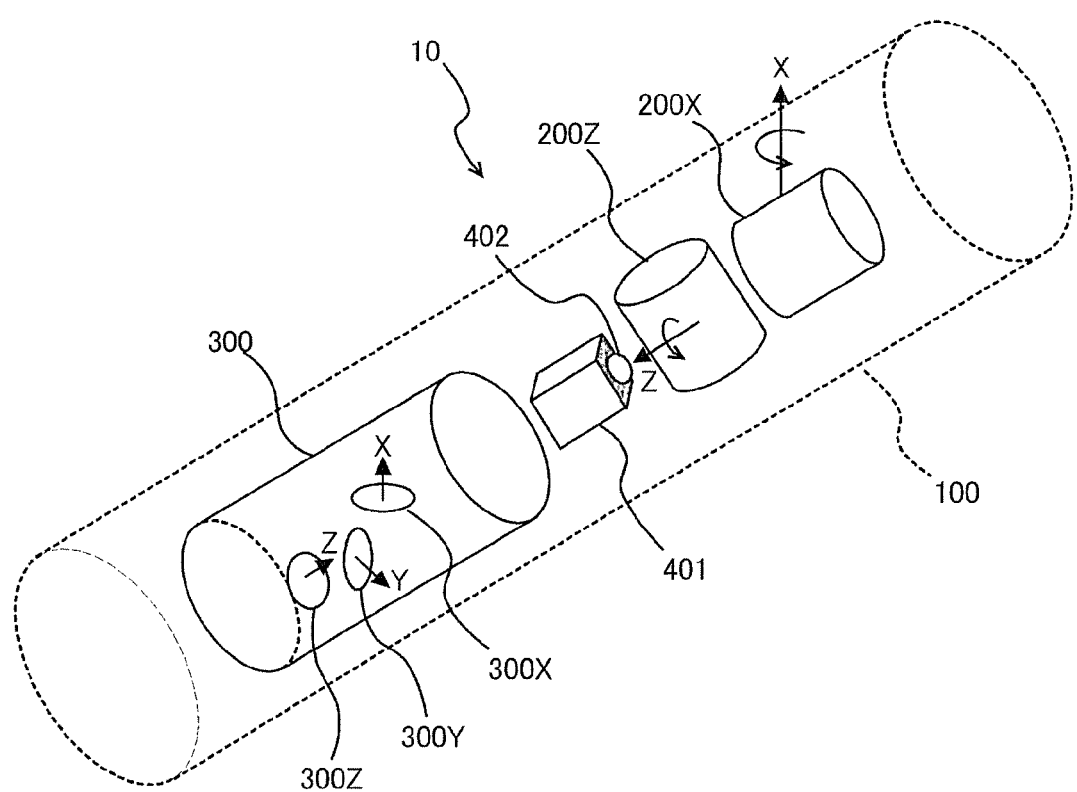
FIG. 18 shows a sensor system including two orthogonal axis gyro sensors and three orthogonal axis accelerometers.

In a limited inclination range, it is possible to use only two orthogonal axis gyro sensors 200X, 200Z for azimuth measurements. In this case, the sensor system 10 includes only two orthogonal axis gyro sensors 200X, 200Z and three orthogonal axis accelerometers (See FIG. 18).

Figure 19:
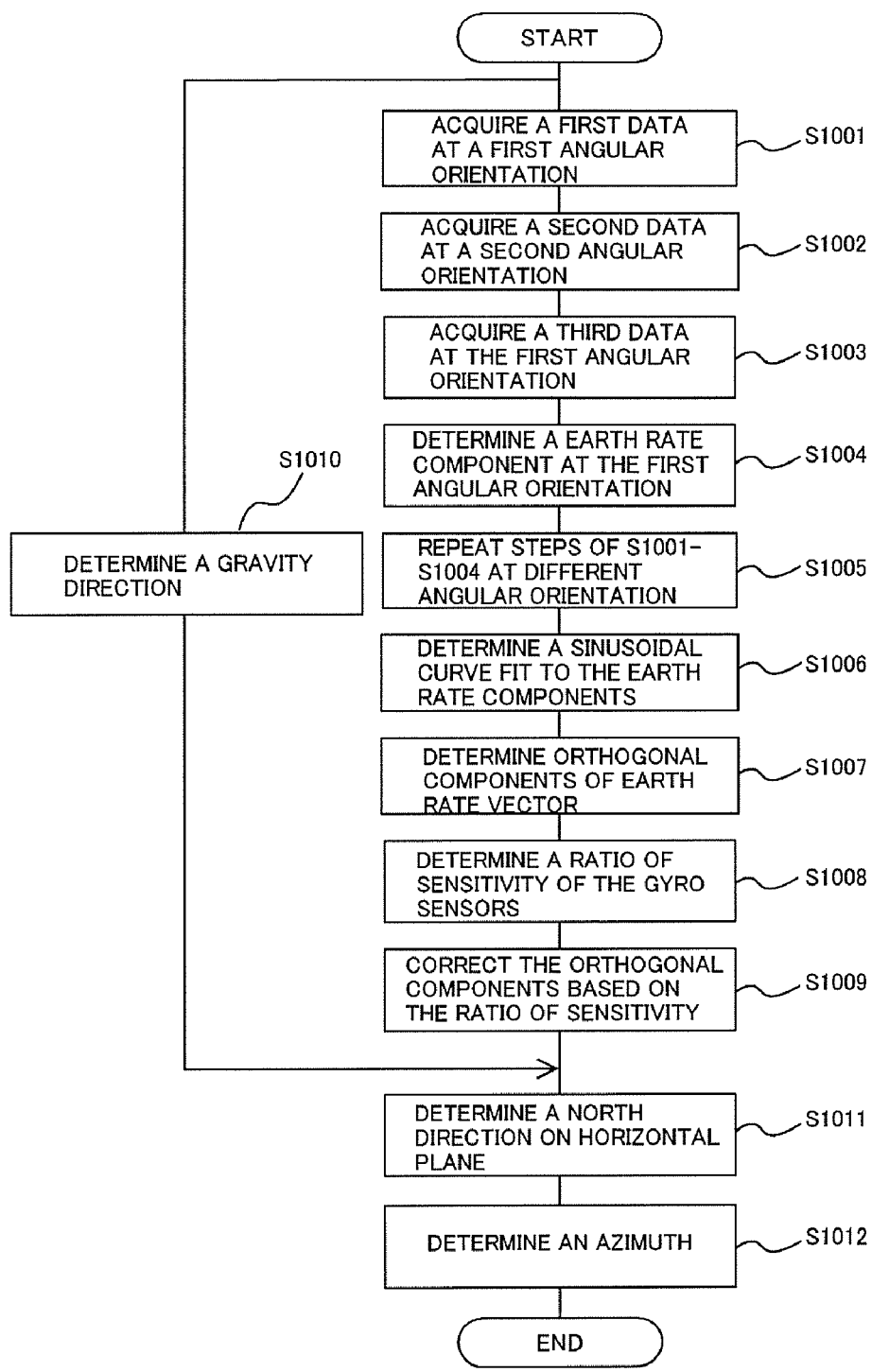
FIG. 19 shows an example of a flow chart of data processing for azimuth measurements by using the sensor system with the two or three orthogonal axis gyro sensors.

FIG. 19 shows an example of a flow chart of data processing for azimuth measurements by using the sensor system 10 with the two or three orthogonal axis gyro sensors. The input axes of the gyro sensors are orthogonal to each other. At least one program having instructions for the data processing is stored in the memory 602 of the data processing unit 600. The sensor system 10 is stationary located at an azimuth measuring position in downhole before azimuth measurements. In this data processing for azimuth measurements, a first data from each of the gyro sensors with an input axis aligned to a first angular orientation (0°) is acquired (S1001). After acquiring the first data, a second data from each of the gyro sensors with the input axis aligned to a second angular orientation (180°) opposite to the first angular orientation is acquired (S1002). After acquiring the second data, a third data from each of the gyro sensors with the input axis aligned to the original first angular orientation (0°) (S1003). An earth rate component at the first angular orientation is determined (S1004) using the aforementioned equations (1)-(5) by following steps of:

(i) obtaining an average $\Omega_{(0°)\_2}$ of the first data $\Omega_{(0°)\_1}$ and the third data $\Omega_{(0°)\_3}$, (ii) determining the earth rate component $\Omega_E$ by subtracting the second data $\Omega_{(180°)\_2}$ from the average $\Omega_{(0°)\_2}$ and dividing the difference by two.

The acquisition of the three data and the determination of the earth rate component for each of the gyro sensors are repeated at a plurality of discrete target angular orientations as shown in FIG. 8 on each of the sensor rotation planes (S1005). A sinusoidal curve ($\Omega_i = A \cos \theta_i + B \sin \theta_i$) is fit to the earth rate components at the discrete target angular orientations on each of the sensor rotation plane and the fitting parameters A and B are determined (S1006). Components of an earth rate vector with respect to a predetermined orthogonal sensor coordinates are determined based on based on a result of the sinusoidal curve fitting (S1007).

Based on a set of data from the gyro sensors with the input axes aligned to the common angular orientation (for example a angular orientation along one of orthogonal axes (x, y, z)), a ratio of sensitivity of a pair of the gyro sensors is determined (S1008). The orthogonal earth rate components corrected based on the ratio of sensitivity to eliminate scale factor error between the gyro sensors (S1009).

In parallel with data processing for the orthogonal earth rate components of an earth rate vector, a gravity direction with respect to the orthogonal sensor coordinates is determined based on acceleration data of gravity acquired with the accelerometers (S1010). A north direction is determined by projecting the earth rate vector onto a horizontal plane perpendicular to the gravity direction (S1011). Finally, an azimuth of a target direction on the horizontal plane is determined based on the north direction (S1012).

Figure 20:
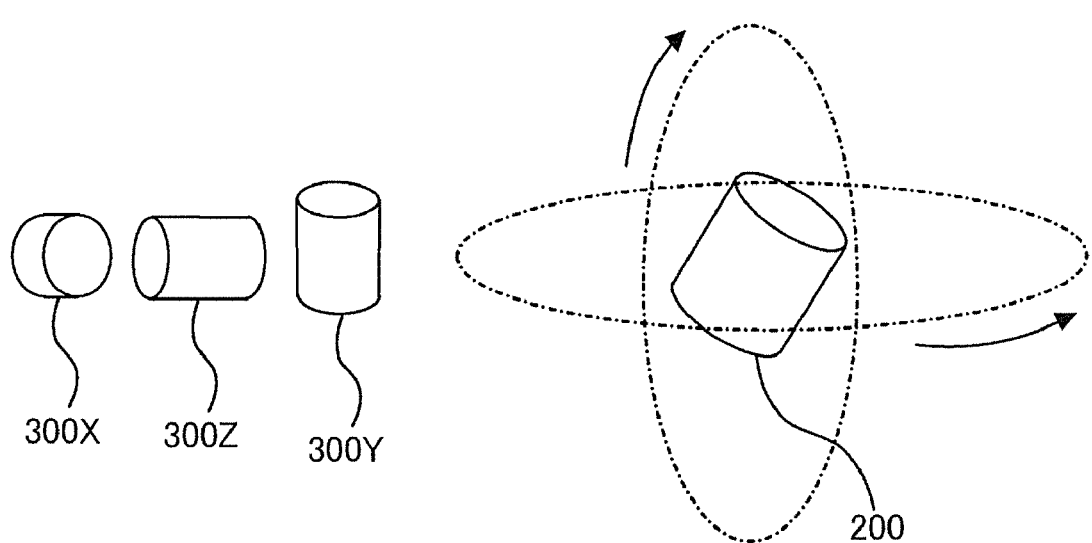
FIG. 20 shows a sensor system including a single gyro sensor and three accelerometers.

If there is no restriction in physical space and measurement time, it is possible to use single gyro sensor 200 and three orthogonal axis accelerometers 300X, 300Y, 300Z. In this case, the single gyro sensor 200 is used to determine earth rate components on three orthogonal axes sequentially. On each axis, flipping the input axis of the gyro sensor is conducted to cancel out the bias error. The measurements with the single gyro sensor 200 are free from the scale factor error (See FIG. 20).

There is a trade-off between dynamic range and resolution of the gyro sensor. If we focus on only azimuth measurements, the dynamic range may be reduced. The dynamic range may be set so as to cover not only the earth rate but also bias drift due to environmental temperature change.

The three accelerometers 300X, 300Y, 300Z may be either conventional Q-flex types or MEMS type accelerometers.

There are many variety types of gyro sensors 200X, 200Y, 200Z used for the azimuth measurements including a MEMS gyro sensor. Among the variety types of gyro sensors, a MEMS gyro sensor of ring oscillating type may be preferably used in terms of the accuracy, measurement robustness in environmental vibration conditions.

In order to reduce noise in wires from a sensor peripheral circuit of a sensor system including at least one gyro sensor, the sensor peripheral circuit may be configured to dispose an analog circuit portion of the sensor peripheral circuit as close as to the gyro sensor and to output only digital signals to the wires. For this configuration, the analog circuit portion may be included together with the gyro sensor head on a flipped stage of the driving mechanism and flipped or rotated together with the sensor head.

The driving mechanism 400 may be configured with only a single motor 401 to flip and/or rotate each input axis of three orthogonal axis gyro sensors 200X, 200Y, 200Z. The rotation force is transmitted through a driving force transmitting mechanism such as a gearbox. The azimuth measurements with the gyro sensors are preferably conducted under a stationary condition, not done while the gyro sensor is rotating. Therefore, the angular orientation accuracy is more important in this configuration.

Figure 21:
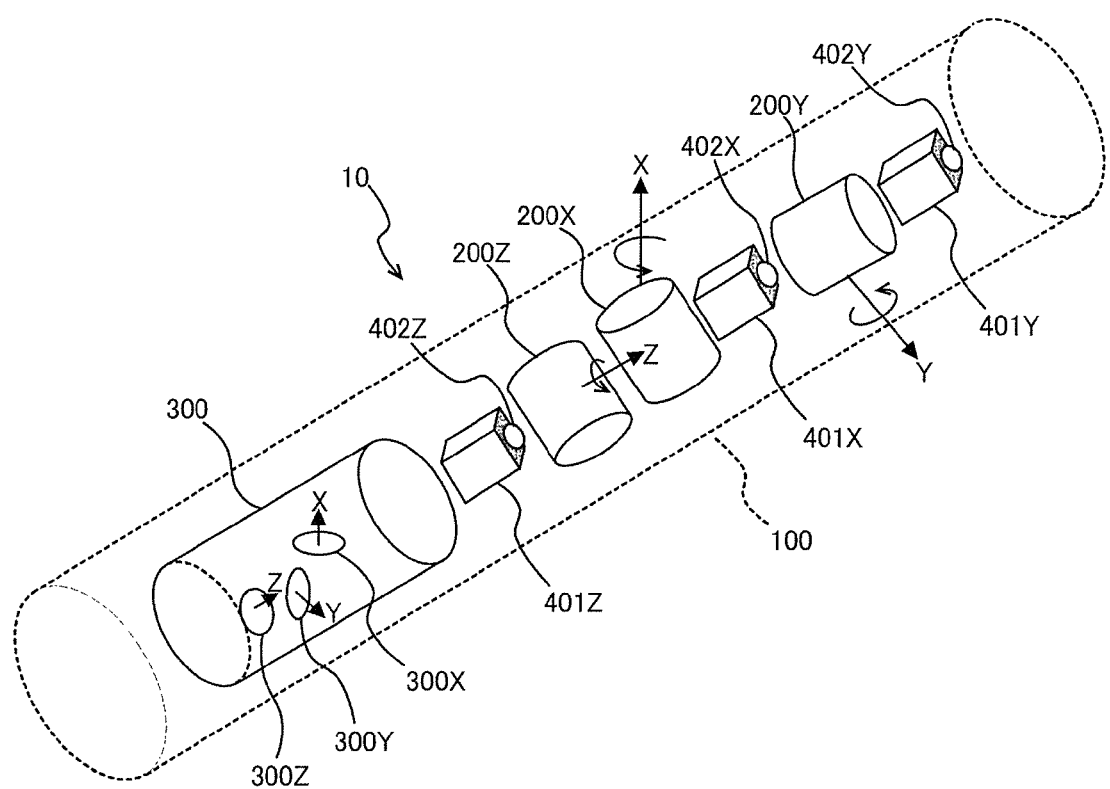
FIG. 21 shows a sensor system including three orthogonal axis gyro sensors and three accelerometers.

The driving mechanism 400 may be also configured with separate motors 401X, 401Y and 401Z. Each separate motor may drive each gyro sensor directly without a gearbox. Angle position sensors 402X, 402Y, 402Z are provided in order to detect rotation angle positions of rotation axes of the motor 401X, 401Y, 401Z, respectively. The driving mechanism 400 with separate motors 401X, 401Y, 401Z may be used to minimize angle errors due to back lash of the gear box in the sensor system with relatively wide physical space for installation. The backlash error causes directly azimuth error (See FIG. 21).

Any gyro sensor has more or less temperature sensitivity in its output. Especially downhole condition in oilfield temperature is changing. Some pre-calibration of the gyro sensor output against temperature using equation for temperature compensation with at least one coefficient may be performed before azimuth measurement in downhole. The coefficient obtained by the pre-calibration may be used to compensate the sensor output by monitoring temperature with a temperature sensor in the sensor part and/or the peripheral circuit. This kind of temperature compensation may be also performed for output data of the accelerometers. The temperature sensors can be installed on the gyro sensor and its analog circuit. The compensation is conducted to compensate temperature dependency of scale factor, bias and misalignment using pre-calibration coefficients of the temperature dependency of each item.

Each output of three-orthogonal axis gyro sensors, three-orthogonal axis accelerometers, and temperature sensors for the gyro sensors and accelerometers is input into the data processing unit. The data processing of the output data may be conducted by a digital signal processing unit (DSP) or a field programmable gate array (FPGA).

The power unit may be configured with a battery. The use of battery has an advantage in MWD and LWD applications, where no electric power is supplied through the cables of MWD and LWD tools.

The sensor system may be installed in a downhole tool. When the Z-axis defined as parallel to a tool axis of the downhole tool is almost vertical, azimuth cannot be defined because of no projection of the Z-axis onto the horizontal plane. Instead of the Z-axis, the projection of other alternative axis onto the horizontal plane may be used to determine an angle from the north direction. The alternative axis may be defined so as to be normal to a reference face on side surface, which is called tool face. The direction of the tool face is determined with gyro sensors and accelerometers in the manner explained above during the tool is under a stationary condition. Once the tool starts moving in downhole, an additional gyro sensor installed in the tool monitors the tool rotation about Z-axis. The additional gyro sensor with an input axis parallel to a tool axis defined in the tool having the gyro sensors for azimuth measurements may be useful to monitor the tool rotation. Dynamic range of the added gyro sensor is large enough to cover the maximum angular rate of the tool rotation. Angular rate output of the additional gyro sensor is integrated to calculate rotation angles of the tool.

While the techniques have been described with respect to a limited number of embodiments, those skilled in the art, having benefit of this disclosure, will be appreciate that other embodiments can be devised which do not depart from the scope of the techniques as disclosed herein. For example, the techniques are applicable to mechanical gyro sensors and optical gyro sensors (e.g. laser gyros and optical fiber gyros) or any other gyro sensors.

What is claimed is:

1. A method for azimuth measurements using a gyro sensor, comprising:
acquiring a first data from the gyro sensor with an input axis aligned to an first angular orientation parallel to a horizontal plane perpendicular to a gravity direction at a measuring position in downhole;
acquiring a second data from the gyro sensor with the input axis flipped to a second angular orientation opposite to the first angular orientation at the measuring position after acquiring the first data;
determining an earth rate component at the first angular orientation based on a difference between the first data and the second data to cancel out bias of the gyro sensor;
determining a north direction on the horizontal plane from latitude at the measuring position; and
determining an azimuth of a target direction on the horizontal plane based on the earth rate component and the north direction.

2. The method according to claim 1, wherein the earth rate component is determined by subtracting the second data from the first data and dividing the difference by two.

3. The method according to claim 2, further comprising:
acquiring a third data of the gyro sensor with the input axis aligned to the same angular orientation as the first angular orientation at the measuring position after acquiring the second data; and
obtaining an average of the first data and the third data,
wherein the average is used instead of the first data for determining the earth rate component.

4. The method according to claim 1, further comprising:
determining an azimuth of a target direction on the horizontal plane based on the earth rate component.

5. The method according to claim 1, wherein the data from the gyro sensor are acquired under a stationary condition.

6. The method according to claim 1, further comprising smoothing the data from the gyro sensor.

7. A method for azimuth measurements using two or three gyro sensors, comprising:
acquiring a first data from each of the gyro sensors with an input axis aligned to an first angular orientation at a measuring position in downhole, the input axes of the gyro sensors being orthogonal to each other;
acquiring a second data from each of the gyro sensors with the input axis flipped to a second angular orientation opposite to the first angular orientation at the measuring position after acquiring the first data;
determining an earth rate component at the first angular orientation based on a difference between the first data and the second data to cancel out bias of each of the gyro sensors;
fitting a sinusoidal curve to the earth rate components at the plurality of discrete angular orientations;
determining an earth rate vector with respect to a predetermined orthogonal sensor coordinates based on based on a result of the sinusoidal curve fitting;
determining a gravity direction with respect to the orthogonal sensor coordinates based on acceleration data of gravity acquired with the accelerometers;
determining a north direction by projecting the earth rate vector onto a horizontal plane perpendicular to the gravity direction; and
determining an azimuth of a target direction on the horizontal plane based on the north direction.

8. The method according to claim 7, wherein the earth rate components are determined by subtracting the second data from the first data and dividing the difference data by two.

9. The method according to claim 8, further comprising:
acquiring a third data from each of the gyro sensors with the input axis aligned to the same angular orientation as the first angular orientation at the measuring position after acquiring the second data; and
obtaining an average of the first data and the third data,
wherein the average is used instead of the first data for determining the earth rate component.

10. The method according to claim 7, further comprising:
determining an earth rate vector with respect to a predetermined orthogonal sensor coordinates based on the earth rate components;
determining a north direction by projecting the earth rate vector onto a horizontal plane perpendicular to a gravity direction; and
determining an azimuth of a target direction on the horizontal plane based on the north direction.

11. The method according to claim 10, wherein the target direction is one of coordinate axes of the orthogonal sensor coordinates.

12. The method according to claim 7, wherein the data from each of the gyro sensors are acquired under a stationary condition.

13. The method according to claim 7, further comprising smoothing the data from each of the gyro sensors.

14. The method according to claim 7, wherein the gyro sensors are located at a measuring position in downhole when acquiring the data from the gyro sensors.

15. A method for azimuth measurements using two or three gyro sensors, comprising:
acquiring a first data from each of the gyro sensors with an input axis aligned to an first angular orientation at a measuring position in downhole, the input axes of the gyro sensors being orthogonal to each other;
acquiring a second data from each of the gyro sensors with the input axis flipped to a second angular orientation opposite to the first angular orientation at the measuring position after acquiring the first data;
determining an earth rate component at the first angular orientation based on a difference between the first data and the second data to cancel out bias of each of the gyro sensors;
repeating acquiring the first data, acquiring the second data and determining the earth rate component, after rotating each of the gyro sensors so as to align each input axis of the gyro sensors to another first angular orientation rotated by 90 degrees from the original first angular orientation;
fitting a sinusoidal curve to the earth rate components at the plurality of discrete angular orientations;
determining an earth rate vector with respect to a predetermined orthogonal sensor coordinates based on based on a result of the sinusoidal curve fitting;
determining a gravity direction with respect to the orthogonal sensor coordinates based on acceleration data of gravity acquired with the accelerometers;
determining a north direction by projecting the earth rate vector onto a horizontal plane perpendicular to the gravity direction; and
determining an azimuth of a target direction on the horizontal plane based on the north direction.

16. The method according to claim 15, wherein the earth rate component is determined by subtracting the second data from the first data and dividing the difference data by two.

17. The method according to claim 15, further comprising:
acquiring a third data from each of the gyro sensors with the input axis aligned to the same angular orientation as the first angular orientation at the measuring position after acquiring the second data;
obtaining an average of the first data and the third data, and repeating acquiring the third data and obtaining the average, after rotating each of the gyro sensors so as to align each of the input axes of the gyro sensors to another first angular orientation,
wherein the average is used instead of the first data for determining the earth rate component.

18. The method according to claim 15, further comprising:
determining a ratio of sensitivity of a pair of the gyro sensors based on a set of data from the gyro sensors with the input axes aligned to the common first angular orientation;
correcting the earth rate components used for determining the earth rate vector, based on the ratio of sensitivity; and
determining an earth rate vector with respect to a predetermined orthogonal sensor coordinates based on the corrected earth rate components.

19. The method according to claim 18, wherein the earth rate vector $\Omega_0$ is determined based on a predetermined threshold value and a selection criterion with following three equations;

If $\Omega_{Cz}$>threshold value, use $$\Omega_0 = \left(\Omega_{Cx}\frac{\Omega_{Az}}{\Omega_{Cz}}, \Omega_{Ay}, \Omega_{Az}\right),$$

If $\Omega_{Bx}$>threshold value, use $$\Omega_0 = \left(\Omega_{Cx}, \Omega_{By}\frac{\Omega_{Cx}}{\Omega_{Bx}}, \Omega_{Cz}\right),$$

If $\Omega_{Ay}$>threshold value, use $$\Omega_0 = \left(\Omega_{Bx}, \Omega_{By}, \Omega_{Az}\frac{\Omega_{By}}{\Omega_{Ay}}\right),$$

where $\Omega_{Ax}$, $\Omega_{Ay}$ and $\Omega_{Az}$ represent earth rate components on orthogonal axes measured by an XY-gyro sensor with an input axis rotatable about a Z-axis, $\Omega_{Bx}$, $\Omega_{By}$ and $\Omega_{Bz}$ represent earth rate components on the orthogonal axes measured by a YZ-gyro sensor with an input axis rotatable about an X-axis, and $\Omega_{Cx}$, $\Omega_{Cy}$ and $\Omega_{Cz}$ represent earth rate components on the orthogonal axes measured by a ZX-gyro sensor with an input axis rotatable about a Y-axis.

20. The method according to claim 18, further comprising:
determining a north direction by projecting the earth rate vector onto a horizontal plane perpendicular to a gravity direction; and
determining an azimuth of a target direction on the horizontal plane based on the north direction.

21. The method according to claim 20, wherein the target direction is one of coordinate axes of the orthogonal sensor coordinates.

22. The method according to claim 15, wherein the data from each of the gyro sensors are acquired under a stationary condition.

23. The method according to claim 15, further comprising smoothing the data from each of the gyro sensors.

24. The method according to claim 15, wherein the gyro sensors are located at a measuring position in downhole when acquiring the data from the gyro sensors.

25. A method for azimuth measurements using two or three gyro sensors, comprising:
acquiring a first data from each of the gyro sensors with an input axis aligned to a first angular orientation at a measuring position in downhole, the input axes of the gyro sensors being orthogonal to each other;
acquiring a second data from each of the gyro sensors with the input axis flipped to a second angular orientation opposite to the first angular orientation at the measuring position after acquiring the first data;
determining an earth rate component at the first angular orientation based on a difference between the first data and the second data to cancel out bias of each of the gyro sensors;
repeating acquiring the first data, acquiring the second data and determining the earth rate component for each of the gyro sensors at a plurality of discrete angular orientations;
fitting a sinusoidal curve to the earth rate components at the plurality of discrete angular orientations;
determining an earth rate vector with respect to a predetermined orthogonal sensor coordinates based on based on a result of the sinusoidal curve fitting;
determining a gravity direction with respect to the orthogonal sensor coordinates based on acceleration data of gravity acquired with the accelerometers;
determining a north direction by projecting the earth rate vector onto a horizontal plane perpendicular to the gravity direction; and
determining an azimuth of a target direction on the horizontal plane based on the north direction.

26. The method according to claim 25, wherein the sinusoidal curve is expressed as follows:

$$\Omega_i = A \cos \theta_i + B \sin \theta_i$$

where $\Omega_i$ is an earth rate component at an angular orientation $\theta_i$, and A and B are fitting parameters; and
wherein fitting the sinusoidal curve comprises determining the fitting parameters A and B.

27. The method according to claim 25, wherein the earth rate component is determined by subtracting the second data from the first data and dividing the difference by two.

28. The method according to claim 25, further comprising:
acquiring a third data from each of the gyro sensors with the input axis aligned to the same angular orientation as the first angular orientation at the measuring position after acquiring the second data;
obtaining an average of the first data and the third data; and
repeating acquiring the third data and obtaining the average for each of the gyro sensors at the plurality of discrete angular orientations,
wherein the average is used instead of the first data for determining the earth rate component.

29. The method according to claim 25, further comprising:
determining a ratio of sensitivity of a pair of the gyro sensors based on a set of data from the gyro sensors with the input axes aligned to the common first angular orientation; and
correcting the earth rate components used for determining the earth rate vector, based on the ratio of sensitivity.

30. The method according to claim 29, wherein the earth rate vector $\Omega_0$ is determined based on a predetermined threshold value and a selection criterion with following three equations;

If $\Omega_{Cz}$>threshold value, use $$\Omega_0 = \left(\Omega_{Cx}\frac{\Omega_{Az}}{\Omega_{Cz}}, \Omega_{Ay}, \Omega_{Az}\right),$$

If $\Omega_{Bx}$>threshold value, use $$\Omega_0 = \left(\Omega_{Cx}, \Omega_{By}\frac{\Omega_{Cx}}{\Omega_{Bx}}, \Omega_{Cz}\right),$$

If $\Omega_{Ay}$>threshold value, use $$\Omega_0 = \left(\Omega_{Bx}, \Omega_{By}, \Omega_{Az}\frac{\Omega_{By}}{\Omega_{Ay}}\right),$$

where $\Omega_{Ax}$, $\Omega_{Ay}$ and $\Omega_{Az}$ represent earth rate components on orthogonal axes measured by an XY-gyro sensor with an input axis rotatable about a Z-axis, $\Omega_{Bx}$, $\Omega_{By}$ and $\Omega_{Bz}$ represent earth rate components on the orthogonal axes measured by a YZ-gyro sensor with an input axis rotatable about an X-axis, and $\Omega_{Cx}$, $\Omega_{Cy}$ and $\Omega_{Cz}$ represent earth rate components on the orthogonal axes measured by a ZX-gyro sensor with an input axis rotatable about a Y-axis.

31. The method according to claim 25, further comprising:
determining a north direction by projecting the earth rate vector onto a horizontal plane perpendicular to a gravity direction; and
determining an azimuth of a target direction on the horizontal plane based on the north direction.

32. The method according to claim 31, wherein the target direction is one of the coordinate axes of the orthogonal sensor coordinates.

33. The method according to claim 25, wherein the data from each of the gyro sensors are acquired under a stationary condition.

34. The method according to claim 25, further comprising smoothing the data from each of the gyro sensors.

35. The method according to claim 25, wherein the gyro sensors are located at a measuring position in downhole when acquiring the data from the gyro sensors.

36. A system for azimuth measurements, comprising:
a housing;
two or three gyro sensors having input axes orthogonal to each other;
three orthogonal axis accelerometers;
a driving mechanism for rotating or flipping the gyro sensors;
a controller for controlling the driving mechanism;
a data processing unit; and
a power supply unit,
wherein the data processing unit comprises a computer having a processor and a memory,
wherein the memory stores a program having instructions for:
acquiring a first data from each of the gyro sensors with an input axis aligned to a first angular orientation;
acquiring a second data from each of the gyro sensors with the input axis flipped to a second angular orientation opposite to the first angular orientation after acquiring the first data;
determining an earth rate component at the first angular orientation based on a difference between the first data and the second data to cancel out bias of each of the gyro sensors;
repeating acquiring the first data, acquiring the second data and determining the earth rate component for each of the gyro sensors at a plurality of discrete angular orientations;
fitting a sinusoidal curve to the earth rate components at the plurality of discrete angular orientations;
determining an earth rate vector with respect to a predetermined orthogonal sensor coordinates based on based on a result of the sinusoidal curve fitting;
determining a gravity direction with respect to the orthogonal sensor coordinates based on acceleration data of gravity acquired with the accelerometers;
determining a north direction by projecting the earth rate vector onto a horizontal plane perpendicular to the gravity direction; and
determining an azimuth of a target direction on the horizontal plane based on the north direction.

37. The method according to claim 36, wherein the target direction is one of the coordinate axes of the orthogonal sensor coordinates.

38. The system according to claim 36, wherein the sinusoidal curve is expressed as follows:

$$\Omega_i = A\cos\theta_i + B\sin\theta_i$$

where $\Omega_i$ is an earth rate component at an angular orientation $\theta_i$, and A and B are fitting parameters, and
wherein fitting the sinusoidal curve comprises determining the fitting parameters A and B.

39. The system according to claim 36, wherein the earth rate component is determined by subtracting the second data from the first data and dividing the difference data by two.

40. The system according to claim 39, the program further having instructions for:
acquiring a third data from each of the gyro sensors with the input axis aligned to the same angular orientation as the first angular orientation after acquiring the second data;
obtaining an average of the first data and the third data; and
repeating acquiring the third data and obtaining the average for each of the gyro sensors at a plurality of discrete angular orientations,
wherein the average is used instead of the first data for determining the earth rate component.

41. The system according to claim 36, the program further having instructions for:
determining a ratio of sensitivity of a pair of the gyro sensors based on a set of data from the gyro sensors with the input axes aligned to the common first angular orientation; and
correcting the earth rate components used for determining the earth rate vector, based on the ratio of sensitivity.

42. The system according to claim 41, wherein the gyro sensors comprise an XY-gyro sensor with an input axis rotatable about a Z-axis, a YZ-gyro sensor with an input axis rotatable about an X-axis, and a ZX-gyro sensor with an input axis rotatable about a Y-axis, and
wherein the earth rate vector $\Omega_0$ is determined based on a predetermined threshold value and a selection criterion with following three equations;

If $\Omega_{Cz}$>threshold value, use $$\Omega_0 = \left(\Omega_{Cx}\frac{\Omega_{Az}}{\Omega_{Cz}}, \Omega_{Ay}, \Omega_{Az}\right),$$

If $\Omega_{Bx}$>threshold value, use $$\Omega_0 = \left(\Omega_{Cx}, \Omega_{By}\frac{\Omega_{Cx}}{\Omega_{Bx}}, \Omega_{Cz}\right),$$

If $\Omega_{Ay}$>threshold value, use $$\Omega_0 = \left(\Omega_{Bx}, \Omega_{By}, \Omega_{Az}\frac{\Omega_{By}}{\Omega_{Ay}}\right),$$

where $\Omega_{Ax}$, $\Omega_{Ay}$, and $\Omega_{Az}$ represent earth rate components on orthogonal axes measured by the XY-gyro sensor, $\Omega_{Bx}$, $\Omega_{By}$, and $\Omega_{Bz}$ represent earth rate components on the orthogonal axes measured by the YZ-gyro sensor, and $\Omega_{Cx}$, $\Omega_{Cy}$, and $\Omega_{Cz}$ represent earth rate components on the orthogonal axes measured by the ZX-gyro sensor.

43. The system according to claim 36, wherein the data from each of the gyro sensors are acquired under a stationary condition.

44. The system according to claim 36, the program further having an instruction for smoothing the data from each of the gyro sensors.

45. The system according to claim 36, wherein the azimuth measurement is performed using the gyro sensors located at the measuring position in downhole.

46. The system according to claim 36, wherein the gyro rotating mechanism is configured to rotate each of the gyro sensors about an axis perpendicular to the input axis.

47. The system according to claim 36, wherein each of the accelerometers is a MEMS type accelerometer.

48. The system according to claim 36, wherein each of the gyro sensors is a MEMS type gyro sensor.

49. The system according to claim 48, wherein the MEMS gyro sensor is a ring oscillating type gyro sensor.

50. The system according to claim 36, wherein the rotating mechanism is configured to rotate a peripheral circuit of the gyro sensor together with the gyro sensor, and wherein the peripheral circuit outputs digital signals.

51. The system according to claim 36, wherein the rotating mechanism includes at least one set of a motor and a gear mechanism transporting rotating force from the motor to the gyro sensor.

52. The system according to claim 36, the rotating mechanism includes at least one step motor to flip or rotate the gyro sensors.

53. The system according to claim 36, wherein each of the gyro sensors includes the rotating mechanism.

54. The system according to claim 36, wherein the gyro rotating mechanism includes at least one angle position sensor for measuring a rotation angle of each of the gyro sensors with respect to a reference direction and monitoring each of the angular orientations.

55. The system according to claim 36, further comprising:
at least one temperature sensor to measure temperature of the gyro sensors and the accelerometers.

56. The system according to claim 55, wherein the measured temperature is used to compensate temperature effect in the gyro sensors and the accelerometers.

57. The system according to claim 36, further comprising at least one gyro sensor for monitoring rotation of a downhole tool having the system,
wherein the rotation of the downhole tool is monitored based on the azimuth measurement performed at predetermined timing in downhole.

58. The system according to claim 36, wherein the data processing unit is a DSP or a FPGA.

59. The system according to claim 36, wherein the power unit is a battery.

* * * * *